US012614826B2

(12) United States Patent
Uemichi

(10) Patent No.: US 12,614,826 B2
(45) Date of Patent: Apr. 28, 2026

(54) DIGITAL PHASE SHIFTER

(71) Applicant: Fujikura Ltd., Tokyo (JP)

(72) Inventor: Yusuke Uemichi, Sakura (JP)

(73) Assignee: Fujikura Ltd., Tokyo (JP)

( * ) Notice: Subject to any disclaimer, the term of this patent is extended or adjusted under 35 U.S.C. 154(b) by 252 days.

(21) Appl. No.: 18/273,897

(22) PCT Filed: Feb. 7, 2023

(86) PCT No.: PCT/JP2023/003961
§ 371 (c)(1),
(2) Date: Jul. 24, 2023

(87) PCT Pub. No.: WO2024/018659
PCT Pub. Date: Jan. 25, 2024

(65) Prior Publication Data
US 2024/0396193 A1 Nov. 28, 2024

(30) Foreign Application Priority Data
Jul. 19, 2022 (JP) ................................ 2022-114658

(51) Int. Cl.
*H01P 1/18* (2006.01)

(52) U.S. Cl.
CPC .................................. *H01P 1/184* (2013.01)

(58) Field of Classification Search
CPC . H01P 1/184; H01P 5/08; H01P 1/185; H03H 11/16; H03H 17/08
See application file for complete search history.

(56) References Cited

U.S. PATENT DOCUMENTS 10,291,282 B1 * 5/2019 Lin .......................... H04B 1/52
2019/0157754 A1 5/2019 Valdes Garcia et al.
(Continued)

FOREIGN PATENT DOCUMENTS

JP 7076658 B1 5/2022
JP 7076663 B1 5/2022
JP 7087215 B1 6/2022

OTHER PUBLICATIONS

International Search Report dated Apr. 18, 2023, issued in counterpart International Application No. PCT/JP2023/003961. (2 pages).
(Continued)

*Primary Examiner* — Quan Tra
(74) *Attorney, Agent, or Firm* — WHDA, LLP

(57) ABSTRACT

A digital phase shifter (100) includes a bend-type connection unit (e.g., a connection unit (20-1)) connecting a first digital phase shift circuit (e.g., a digital phase shift circuit (10-10)) located at an end portion of a first digital phase shift circuit group and a second digital phase shift circuit (e.g., a digital phase shift circuit (10-11)) located at an end portion of a second digital phase shift circuit group, and a capacitor (50) is connected in parallel to at least one of a first connection line of the connection unit (20), a position in the vicinity of a connection position between signal lines of two adjacent digital phase shift circuits (10) constituting the first digital phase shift circuit group, and a position in the vicinity of a connection position between signal lines of two adjacent digital phase shift circuits (10) constituting the second digital phase shift circuit group.

8 Claims, 14 Drawing Sheets

(56) References Cited

U.S. PATENT DOCUMENTS

| | | | | |
|---|---|---|---|---|
| 2019/0158068 | A1 | 5/2019 | Valdes Garcia et al. | |
| 2021/0135656 | A1 | 5/2021 | Birkbeck et al. | |
| 2022/0131247 | A1* | 4/2022 | Li | H01P 11/00 |

OTHER PUBLICATIONS

Tousi et al., "A Ka-band Digitally-Controlled Phase Shifter with sub-degree Phase Precision", 2016 IEEE Radio Frequency Integrated Circuits Symposium, (2016), pp. 356-359. Cited in Specification and ISR. (4 pages).

Hong-Teuk Kim et al,"A Compact V-Band 2-Bit Reflection-Type MEMS Phase Shifter", IEEE Microwave and Wireless Components Letters, IEEE Service Center, New York, NY, US, vol. 12, No. 9, Sep. 1, 2002 (Sep. 1, 2002), XP011066900, ISSN: 1531-1309, pp. 324-326, cited in EP Office Action dated Jun. 25, 2024. (3 pages).

* cited by examiner

DIGITAL PHASE SHIFTER

TECHNICAL FIELD

The present invention relates to a digital phase shifter.

Priority is claimed on Japanese Patent Application No. 2022-114658, filed Jul. 19, 2022, the content of which is incorporated herein by reference.

BACKGROUND ART

In Patent Document 1, a digitally controlled phase shift circuit (a digital phase shift circuit) for high-frequency signals such as microwaves, quasi-millimeter waves, millimeter waves or the like is disclosed. The digital phase shift circuit is mounted on a semiconductor substrate actually in a state in which a large number of the digital phase shift circuits are connected in cascade. That is, the digital phase shift circuit is a unitary unit in the configuration of an actual digital phase shifter, and a desired function is exhibited by connecting several tens of digital phase shift circuits in cascade.

When the configuration of the digital phase shifter is a configuration in which the above digital phase shift circuits are connected in a line, the length of the digital phase shifter increases. In order to shorten the length of the digital phase shifter, for the configuration of the digital phase shifter, adopting a configuration in which it is bent using a connection unit such as a bend-type line or the like having a bent structure is conceivable.

PRIOR ART DOCUMENT

Non-Patent Document

[Non-Patent Document 1] A Ka-band Digitally-Controlled Phase Shifter with Sub-degree Phase Precision (2016, IEEE, RFIC)

DISCLOSURE OF INVENTION

Problems to be Solved by the Invention

Meanwhile, in a digital phase shifter with a configuration in which a large number of digital phase shift circuits are connected in cascade, it is desirable to eliminate a distribution of phase shift amounts. However, in the above-described digital phase shifter configured to be bent using a connection unit such as a bend-type line or the like, a distribution of phase shift amounts is caused by weak reflections occurring in preceding and following positions of the connection unit in a situation in which suitable input/output impedance matching is achieved.

The present invention has been made in view of the above-described circumstances and provides a digital phase shifter capable of averaging a distribution of phase shift amounts caused by weak reflections occurring in preceding and following positions of a connection unit.

Means for Solving the Problems

A digital phase shifter according to a first aspect of the present invention includes: at least one first digital phase shift circuit group in which a plurality of digital phase shift circuits are connected in cascade; at least one second digital phase shift circuit group in which a plurality of digital phase shift circuits are connected in cascade; and at least one bend-type connection unit connecting a first digital phase shift circuit located at an end portion of the first digital phase shift circuit group and a second digital phase shift circuit located at an end portion of the second digital phase shift circuit group, wherein each digital phase shift circuit is a circuit including at least a signal line, two inner lines provided on both sides of the signal line, two outer lines provided outside of the two inner lines, a first ground conductor connected to one end of each of the two inner lines and the two outer lines, a second ground conductor connected to the other end of each of the two outer lines, and two electronic switches, one thereof being provided between the other end of one of the two inner lines and the second ground conductor, the other thereof being provided between the other end of the other of the two inner lines and the second ground conductor, the circuit being set in a low-delay mode in which a return current flows through the two inner lines or a high-delay mode in which a return current flows through the two outer lines, and wherein a capacitor is connected in parallel to at least one of a first connection line of the connection unit connecting the signal line of the first digital phase shift circuit and the signal line of the second digital phase shift circuit, a position in a vicinity of a connection position between signal lines of two adjacent digital phase shift circuits constituting the first digital phase shift circuit group, and a position in a vicinity of a connection position between signal lines of two adjacent digital phase shift circuits constituting the second digital phase shift circuit group.

In the digital phase shifter according to the first aspect of the present invention, the capacitor is connected in parallel to at least one of the first connection line of the connection unit, a position between two adjacent digital phase shift circuits constituting the first digital phase shift circuit group, and a position between two adjacent digital phase shift circuits constituting the second digital phase shift circuit group. Thereby, it is possible to average a distribution of phase shift amounts caused by weak reflections occurring in preceding and following positions of the connection unit.

A second aspect of the present invention is that in the digital phase shifter of the first aspect, the capacitor is connected in parallel to an intermediate portion of at least one first connection line.

A third aspect of the present invention is that in the digital phase shifter of the first or second aspect, the capacitor is connected in parallel to each of one end portion of at least one first connection line on the first digital phase shift circuit side and the other end portion of the one first connection line on the second digital phase shift circuit side.

A fourth aspect of the present invention is that in the digital phase shifter of any one of the first to third aspects, the capacitor is connected in parallel to each of a position in a vicinity of a connection position between the signal line of the first digital phase shift circuit and the signal line of a third digital phase shift circuit adjacent to the first digital phase shift circuit and a position in a vicinity of a connection position between the signal line of the second digital phase shift circuit and the signal line of a fourth digital phase shift circuit adjacent to the second digital phase shift circuit.

A fifth aspect of the present invention is that the digital phase shifter of any one of the first to fourth aspects includes an electronic switch configured to switch between whether or not to ground one end side of the capacitor.

A sixth aspect of the present invention is that in the digital phase shifter of any one of the first to fifth aspects, at least one of the plurality of digital phase shift circuits is a mitigation circuit configured to mitigate a distribution of phase shift amounts.

A seventh aspect of the present invention is that in the digital phase shifter of any one of the first to sixth aspects, at least one of the plurality of digital phase shift circuits includes: a second capacitor connected between the signal line and at least one of the first ground conductor and the second ground conductor; and a second electronic switch configured to switch between whether or not to connect the second capacitor between the signal line and the at least one of the first ground conductor and the second ground conductor.

An eighth aspect of the present invention is that in the digital phase shifter of any one of the first to seventh aspects, the connection unit includes: two second connection lines connecting the two inner lines of the first digital phase shift circuit and the two inner lines of the second digital phase shift circuit; a ground layer arranged in at least one of positions above and below the first connection line and the two second connection lines; and a via-hole connecting at least the two second connection lines and the ground layer.

A ninth aspect of the present invention is that in the digital phase shifter of the eighth aspect, the connection unit includes two third connection lines connecting the two outer lines of the first digital phase shift circuit and the two outer lines of the second digital phase shift circuit.

Effects of the Invention

According to the aspect of the present invention, it is possible to average a distribution of phase shift amounts caused by weak reflections occurring in preceding and following positions of a connection unit.

EMBODIMENTS FOR CARRYING OUT THE INVENTION

Digital phase shifters according to embodiments of the present invention will be described below in detail with reference to the drawings.

First Embodiment

<Digital Phase Shifter>

Figure 1:
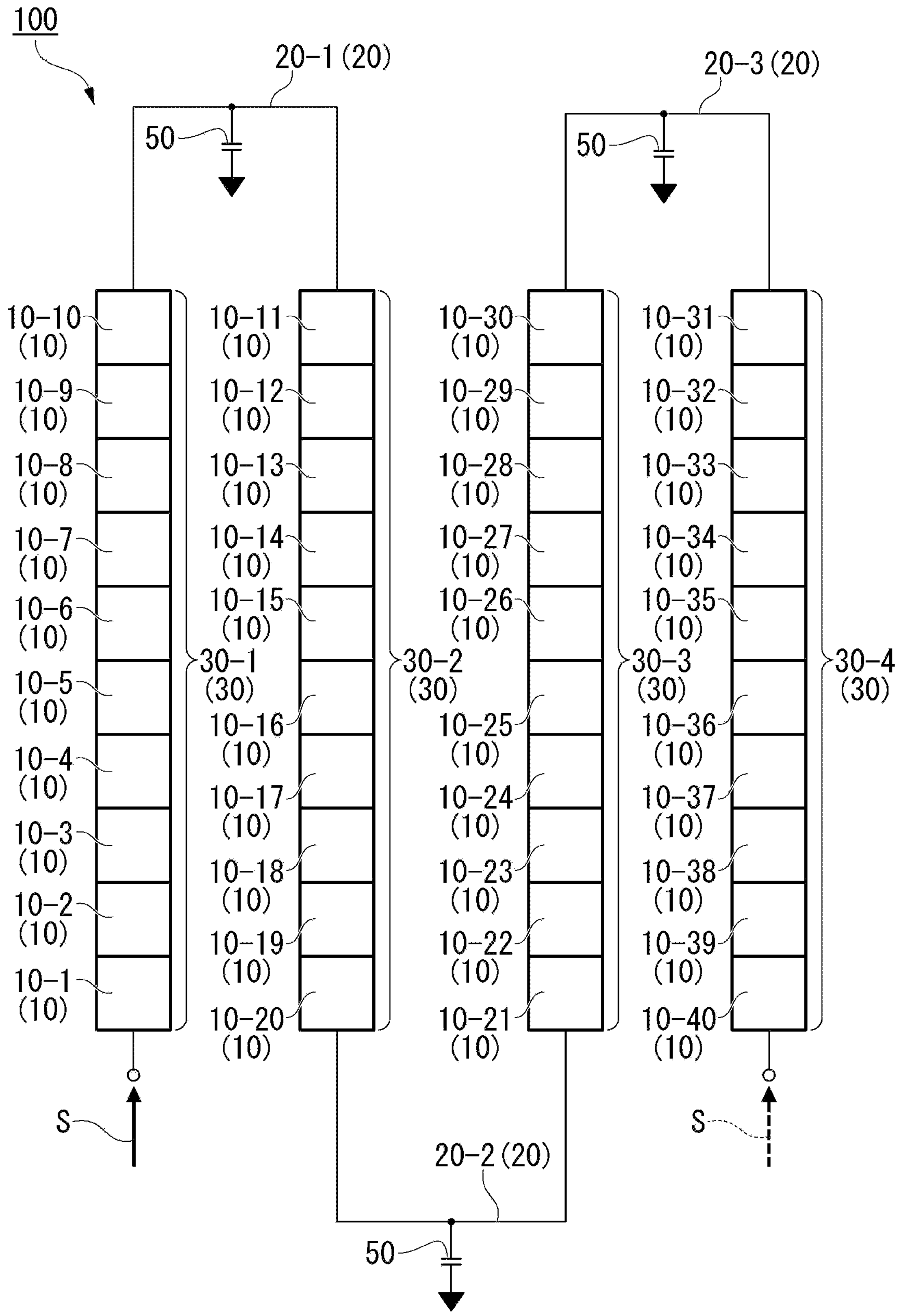
FIG. 1 is a circuit diagram showing a digital phase shifter according to a first embodiment.

FIG. 1 is a circuit diagram showing a digital phase shifter 100 according to a first embodiment. As shown in FIG. 1, a digital phase shifter 100 of the first embodiment includes a plurality of digital phase shift circuits 10 (10-1 to 10-40) and a plurality of connection units 20 (20-1 to 20-3). In this digital phase shifter 100, the plurality of digital phase shift circuits 10 connected in cascade perform a phase shift process for a signal S having a predetermined frequency band. The signal S is a high-frequency signal having a frequency band of microwaves, quasi-millimeter waves, millimeter waves, or the like.

The plurality of digital phase shift circuits 10 are electrically connected in cascade. Although an example in which forty digital phase shift circuits 10 (10-1 to 10-40) are connected in cascade is shown in FIG. 1, the number of digital phase shift circuits 10 connected in cascade is arbitrary. In the example shown in FIG. 1, for convenience of description, the forty digital phase shift circuits 10 connected in cascade are referred to as the digital phase shift circuits 10-1, 10-2, . . . , and 10-40 in the order in which the signal S indicated by a solid arrow in FIG. 1 flows. However, a direction in which the signal S flows may be reversed as indicated by a dotted arrow in FIG. 1. In the following description, it is assumed that a direction indicated by a solid arrow is a direction in which the signal S flows.

Here, the digital phase shift circuits 10 constitute a digital phase shift circuit group 30 in units of a plurality of digital phase shift circuits 10. Specifically, the $1^{st}$ to $10^{th}$ digital phase shift circuits 10-1 to 10-10 constitute a digital phase shift circuit group 30-1, and the $11^{th}$ to $20^{th}$ digital phase shift circuits 10-11 to 10-20 constitute a digital phase shift circuit group 30-2. The $21^{st}$ to $30^{th}$ digital phase shift circuits 10-21 to 10-30 constitute a digital phase shift circuit group 30-3, and the $31^{st}$ to $40^{th}$ digital phase shift circuits 10-31 to 10-40 constitute a digital phase shift circuit group 30-4.

In other words, the digital phase shifter 100 includes the digital phase shift circuit group 30-1 in which the plurality of digital phase shift circuits 10-1 to 10-10 are connected in cascade and the digital phase shift circuit group 30-2 in which the plurality of digital phase shift circuits 10-11 to 10-20 are connected in cascade. Also, the digital phase shifter 100 includes the digital phase shift circuit group 30-3 in which the plurality of digital phase shift circuits 10-21 to 10-30 are connected in cascade and the digital phase shift circuit group 30-4 in which the plurality of digital phase shift circuits 10-31 to 10-40 are connected in cascade.

The connection unit 20 has a bend-type shape and connects two digital phase shift circuit groups 30. In the example shown in FIG. 1, the connection unit 20 has a shape of a 180° bend. The connection unit 20 is bent such that its extension direction is changed by 180° and both end portions of the connection unit are facing the same direction.

Specifically, the connection unit 20-1 connects the other end of the digital phase shift circuit group 30-1 opposite to one end thereof to which the signal S is input and one end of the digital phase shift circuit group 30-2. The connection unit 20-2 connects the other end of the digital phase shift circuit group 30-2 and one end of the digital phase shift circuit group 30-3. The connection unit 20-3 connects the other end of the digital phase shift circuit group 30-3 and one end of the digital phase shift circuit group 30-4.

That is, the connection unit 20-1 connects the digital phase shift circuit 10-10 (a first digital phase shift circuit) in the digital phase shift circuit group 30-1 (a first digital phase shift circuit group) and the digital phase shift circuit 10-11 (a second digital phase shift circuit) in the digital phase shift circuit group 30-2 (a second digital phase shift circuit group). The connection unit 20-2 connects the digital phase shift circuit 10-20 (a first digital phase shift circuit) in the digital phase shift circuit group 30-2 (a first digital phase shift circuit group) and the digital phase shift circuit 10-21 (a second digital phase shift circuit) in the digital phase shift circuit group 30-3 (a second digital phase shift circuit group). The connection unit 20-3 connects the digital phase shift circuit 10-30 (a first digital phase shift circuit) in the digital phase shift circuit group 30-3 (a first digital phase shift circuit group) and the digital phase shift circuit 10-31 (a second digital phase shift circuit) in the digital phase shift circuit group 30-4 (a second digital phase shift circuit group).

When the digital phase shift circuit group 30-1 and the digital phase shift circuit group 30-2 are connected by the connection unit 20-1, the path of the signal S is bent 180°. Also, when the digital phase shift circuit group 30-2 and the digital phase shift circuit group 30-3 are connected by the connection unit 20-2, the path of the signal S is bent 180°. Likewise, when the digital phase shift circuit group 30-3 and the digital phase shift circuit group 30-4 are connected by the connection unit 20-3, the path of the signal S is bent 180°. Thus, the digital phase shift circuit groups 30-1 to 30-4 are arranged in parallel to each other and are connected in a meander shape via the connection units 20-1 to 20-3. In addition, details of the connection unit 20 will be described below.

<Digital Phase Shift Circuit>

Figure 2:
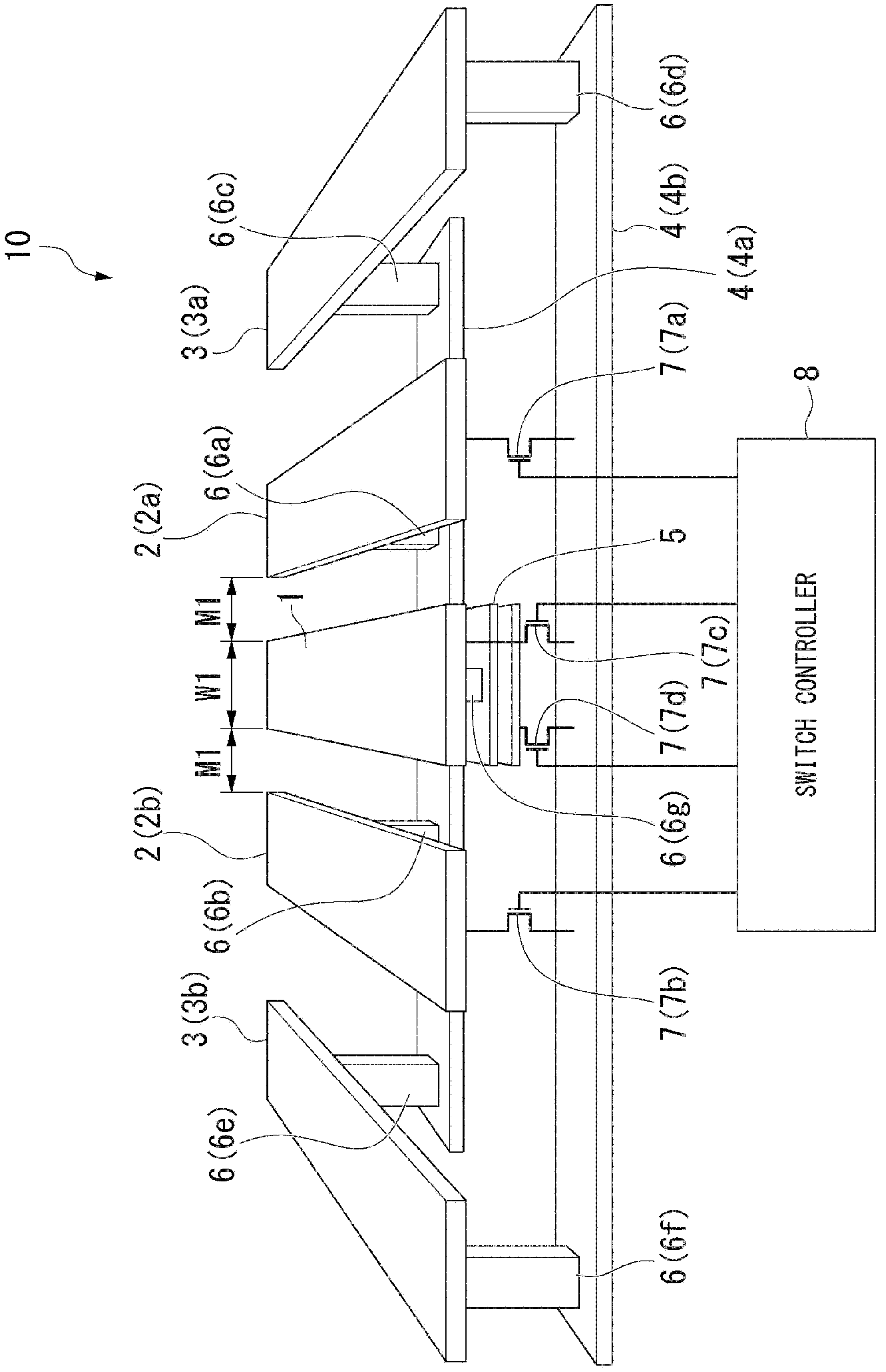
FIG. 2 is a perspective view showing a digital phase shift circuit according to the first embodiment.

FIG. 2 is a perspective view showing the digital phase shift circuit 10 according to the first embodiment. As shown in FIG. 2, the digital phase shift circuit 10 includes a signal line 1, two inner lines 2 (a first inner line 2*a* and a second inner line 2*b*), two outer lines 3 (a first outer line 3*a* and a second outer line 3*b*), two ground conductors 4 (a first ground conductor 4*a* and a second ground conductor 4*b*), a capacitor 5, a plurality of connection conductors 6, four electronic switches 7 (electronic switches 7*a*, 7*b*, 7*c*, and 7*d*), and a switch controller 8.

A side where the signal line 1 is provided in an opposite direction between the signal line 1 and the two ground conductors 4 may be referred to as an upper side of the digital phase shift circuit 10 and a side where the two ground conductors 4 are provided in the opposite direction may be referred to as a lower side of the digital phase shift circuit 10.

The signal line 1 is a linear strip-shaped conductor extending in a predetermined direction. That is, the signal line 1 is a long plate-shaped conductor having a certain width W1, a certain thickness, and a predetermined length. In the example shown in FIG. 2, the signal S flows through the signal line 1 in a direction from the front side (a side where the second ground conductor 4*b* is provided in the extension direction of the signal line 1) to the back side (a side where the first ground conductor 4*a* is provided in the extension direction of the signal line 1).

The first inner line 2*a* is a linear strip-shaped conductor. That is, the first inner line 2*a* is a long plate-shaped conductor having a certain width, a certain thickness, and a predetermined length. The first inner line 2*a* extends in a direction that is the same as the extension direction of the signal line 1. The first inner line 2*a* is provided parallel to the signal line 1 and is separately provided at a predetermined distance M1 on one side of the signal line 1 (the right side in FIG. 1).

The second inner line 2*b* is a linear strip-shaped conductor. That is, the second inner line 2*b* is a long plate-shaped conductor having a certain width, a certain thickness, and a predetermined length similar to the first inner line 2*a*. The second inner line 2*b* extends in a direction that is the same as the extension direction of the signal line 1. The second inner line 2*b* is provided parallel to the signal line 1 and is separately provided at a predetermined distance M1 on the other side of the signal line 1 (the left side in FIG. 1).

The first outer line 3*a* is a linear strip-shaped conductor provided at a position farther from the signal line 1 than the first inner line 2*a* on the one side of the signal line 1. The first outer line 3*a* is a long plate-shaped conductor having a certain width, a certain thickness, and a predetermined length. The first outer line 3*a* is provided parallel to the signal line 1 at an interval of a predetermined distance from the signal line 1 in a state in which the first inner line 2*a* is interposed between the signal line 1 and the first outer line 3*a*. The first outer line 3*a* extends in a direction that is the same as the extension direction of the signal line 1 similarly to the first inner line 2*a* and the second inner line 2*b*.

The second outer line 3*b* is a linear strip-shaped conductor provided at a position farther from the signal line 1 than the second inner line 2*b* on the other side of the signal line 1. The second outer line 3*b* is a long plate-shaped conductor having a certain width, a certain thickness, and a predetermined length similar to the first outer line 3*a*. The second outer line 3*b* is provided in parallel at an interval of a predetermined distance from the signal line 1 in a state in which the second inner line 2*b* is interposed between the second outer line 3*b* and the signal line 1. The second outer line 3*b* extends in a direction that is the same as the extension direction of the signal line 1 similarly to the first inner line 2*a* and the second inner line 2*b*.

The first ground conductor 4*a* is a linear strip-shaped conductor provided on one end side of each of the first inner line 2*a*, the second inner line 2*b*, the first outer line 3*a*, and the second outer line 3*b*. The first ground conductor 4*a* is electrically connected to one end of each of the first inner line 2*a*, the second inner line 2*b*, the first outer line 3*a*, and the second outer line 3*b*. The first ground conductor 4*a* is a long plate-shaped conductor having a certain width, a certain thickness, and a predetermined length.

The first ground conductor 4*a* is provided orthogonal to the first inner line 2*a*, the second inner line 2*b*, the first outer line 3*a*, and the second outer line 3*b* extending in the same direction. The first ground conductor 4*a* is provided below the first inner line 2*a*, the second inner line 2*b*, the first outer line 3*a*, and the second outer line 3*b* at an interval of a predetermined distance therefrom.

The first ground conductor 4*a* is set such that one end thereof in the left and right directions has substantially the same position as the right edge part of the first outer line 3*a*. Also, the first ground conductor 4*a* is set such that the other end thereof in the left and right directions has substantially the same position as the left edge part of the second outer line 3*b*.

The second ground conductor 4*b* is a linear strip-shaped conductor provided on the other end side of each of the first inner line 2*a*, the second inner line 2*b*, the first outer line 3*a*, and the second outer line 3*b*. The second ground conductor 4*b* is a long plate-shaped conductor having a certain width, a certain thickness, and a predetermined length similar to the first ground conductor 4*a*.

The second ground conductor 4*b* is arranged parallel to the first ground conductor 4*a* and is provided orthogonal to the first inner line 2*a*, the second inner line 2*b*, the first outer line 3*a*, and the second outer line 3*b* similarly to the first ground conductor 4*a*. The second ground conductor 4*b* is provided below the first inner line 2*a*, the second inner line 2*b*, the first outer line 3*a*, and the second outer line 3*b* at an interval of a predetermined distance therefrom.

The second ground conductor 4*b* is set such that one end thereof in the left and right directions has substantially the same position as the right edge part of the first outer line 3*a*. Also, the second ground conductor 4*b* is set such that the other end thereof in the left and right directions has substantially the same position as the left edge part of the second outer line 3*b*. That is, the second ground conductor 4*b* has the same position as the first ground conductor 4*a* in the left and right directions.

The capacitor 5 is provided between the other end of the signal line 1 and the second ground conductor 4*b*. For example, the capacitor 5 has an upper electrode connected to the signal line 1 and a lower electrode electrically connected to the electronic switch 7*d*. For example, the capacitor 5 is a thin film capacitor having a metal insulator metal (MIM) structure. In addition, the capacitor 5 has capacitance corresponding to a facing area of the parallel flat plates. Here, instead of a parallel flat plate capacitor, a comb tooth type capacitor may be used as the capacitor 5.

The plurality of connection conductors 6 include at least the connection conductors 6*a* to 6*f*. The connection conductor 6*a* is a conductor that electrically and mechanically connects one end of the first inner line 2*a* and the first ground conductor 4*a*. For example, the connection conductor 6*a* is a conductor extending in the upward/downward direction and has one end (an upper end) connected to the lower surface of the first inner line 2*a* and the other end (a lower end) connected to the upper surface of the first ground conductor 4*a*.

The connection conductor 6*b* is a conductor that electrically and mechanically connects one end of the second inner line 2*b* and the first ground conductor 4*a*. For example, the connection conductor 6*b* is a conductor extending in the upward/downward direction similarly to the connection conductor 6*a* and has one end (an upper end) connected to the lower surface of the second inner line 2*b* and the other end (a lower end) connected to the upper surface of the first ground conductor 4*a*.

The connection conductor 6*c* is a conductor that electrically and mechanically connects one end of the first outer line 3*a* and the first ground conductor 4*a*. For example, the connection conductor 6*c* is a conductor extending in the upward/downward direction and has one end (an upper end) connected to the lower surface at one end of the first outer line 3*a* and the other end (a lower end) connected to the upper surface of the first ground conductor 4*a*.

The connection conductor 6*d* is a conductor that electrically and mechanically connects the other end of the first outer line 3*a* and the second ground conductor 4*b*. For example, the connection conductor 6*d* is a conductor extending in the upward/downward direction and has one end (an upper end) connected to the lower surface at the other end of the first outer line 3*a* and the other end (a lower end) connected to the upper surface of the second ground conductor 4*b*.

The connection conductor 6*e* is a conductor that electrically and mechanically connects one end of the second outer line 3*b* and the first ground conductor 4*a*. For example, the connection conductor 6*e* is a conductor extending in the upward/downward direction and has one end (an upper end) connected to the lower surface at one end of the second outer line 3*b*, and the other end (a lower end) connected to the upper surface of the first ground conductor 4*a*.

The connection conductor 6*f* is a conductor that electrically and mechanically connects the other end of the second outer line 3*b* and the second ground conductor 4*b*. For example, the connection conductor 6*f* is a conductor extending in the upward/downward direction and has one end (an upper end) connected to the lower surface at the other end of the second outer line 3*b* and the other end (a lower end) connected to the upper surface of the second ground conductor 4*b*.

The connection conductor 6*g* is a conductor that electrically and mechanically connects the other end of the signal line 1 and the upper electrode of the capacitor 5. For example, the connection conductor 6*g* is a conductor extending in the upward/downward direction and has one end (an upper end) connected to the lower surface at the other end of the signal line 1 and the other end (a lower end) connected to the upper electrode of the capacitor 5.

The electronic switch 7*a* is connected between the other end of the first inner line 2*a* and the second ground conductor 4*b*. The electronic switch 7*a* is, for example, a metal-oxide-semiconductor (MOS)-type field-effect transistor (FET) and has a drain terminal electrically connected to the other end of the first inner line 2*a*, a source terminal electrically connected to the second ground conductor 4*b*, and a gate terminal electrically connected to the switch controller 8.

The electronic switch 7*a* is controlled to be in a closed state or an open state on the basis of a gate signal input from the switch controller 8 to the gate terminal. The closed state is a state in which the drain terminal and the source terminal are electrically connected. The open state is a state in which the drain terminal and the source terminal are not electrically connected and the electrical connection is disconnected. The electronic switch 7*a* makes the other end of the first inner line 2*a* and the second ground conductor 4*b* be in an electrically connected state in which they are electrically connected or in an electrically disconnected state in which the electrical connection is disconnected by a control process of the switch controller 8.

The electronic switch 7*b* is connected between the other end of the second inner line 2*b* and the second ground conductor 4*b*. The electronic switch 7*b* is a MOS-type FET and has a drain terminal connected to the other end of the second inner line 2*b*, a source terminal connected to the second ground conductor 4*b*, and a gate terminal connected to the switch controller 8.

The electronic switch 7*b* is controlled to be in a closed state or an open state on the basis of a gate signal input from the switch controller 8 to the gate terminal. The electronic switch 7*b* makes the other end of the second inner line 2*b* and the second ground conductor 4*b* be in an electrically connected state in which they are electrically connected or in an electrically disconnected state in which the electrical connection is disconnected by a control process of the switch controller 8.

The electronic switch 7*c* is connected between the other end of the signal line 1 and the second ground conductor 4*b*. The electronic switch 7*c* is, for example, a MOS-type FET, and has a drain terminal connected to the other end of the signal line 1, a source terminal connected to the second ground conductor 4*b*, and a gate terminal connected to the switch controller 8. Although the electronic switch 7*c* is provided on the other end side of the signal line 1 in the example shown in FIG. 2, the present invention is not limited thereto. The electronic switch 7*c* may be provided on one end side of the signal line 1. In addition, the electronic switch 7*c* may not be used if it is not necessary.

The electronic switch 7*c* is controlled to be in a closed state or an open state on the basis of a gate signal input from the switch controller 8 to the gate terminal. The electronic switch 7*c* makes the other end of the signal line 1 and the second ground conductor 4*b* be in an electrically connected state in which they are electrically connected or in an electrically disconnected state in which the electrical connection is disconnected by a control process of the switch controller 8.

The electronic switch 7*d* is connected to be in series with the capacitor 5 between the other end of the signal line 1 and the second ground conductor 4*b*. The electronic switch 7*d* is, for example, a MOS-type FET. In the example shown in FIG. 2, the electronic switch 7*d* has a drain terminal connected to the lower electrode of the capacitor 5, a source terminal connected to the second ground conductor 4*b*, and a gate terminal connected to the switch controller 8.

The electronic switch 7*d* is controlled to be in a closed state or an open state on the basis of a gate signal input from the switch controller 8 to the gate terminal. The electronic switch 7*d* makes the lower electrode of the capacitor 5 and the second ground conductor 4*b* be in an electrically connected state in which they are electrically connected or in an electrically disconnected state in which the electrical connection is disconnected by a control process of the switch controller 8.

The switch controller 8 is a control circuit that controls a plurality of electronic switches 7*a*, 7*b*, 7*c*, and 7*d*. For example, the switch controller 8 includes four output ports. The switch controller 8 individually controls each of the plurality of electronic switches 7 to be in an open state or a closed state by outputting separate gate signals from the output ports and supplying the gate signals to the gate terminals of the plurality of electronic switches 7.

Although a schematic diagram in which the digital phase shift circuit 10 is viewed in perspective such that the mechanical structure of the digital phase shift circuit 10 is easily understood is shown in FIG. 2, the actual digital phase shift circuit 10 is formed as a multilayer structure using semiconductor manufacturing technology.

As an example, in the digital phase shift circuit 10, the signal line 1, the first inner line 2*a*, the second inner line 2*b*, the first outer line 3*a*, and the second outer line 3*b* are formed in a first conductive layer. The first ground conductor 4*a* and the second ground conductor 4*b* are formed in a second conductive layer opposite to the first conductive layer with an insulating layer sandwiched therebetween. A component formed in the first conductive layer and a component formed in the second conductive layer are connected to each other through via-holes. The plurality of connection conductors 6 correspond to the via-holes buried inside of the insulating layer.

Next, an operation of the digital phase shift circuit 10 in the present embodiment will be described. The digital phase shift circuit 10 has a high-delay mode and a low-delay mode as operating modes. The digital phase shift circuit 10 operates in the high-delay mode or the low-delay mode.

<<High-Delay Mode>>

Figure 3:
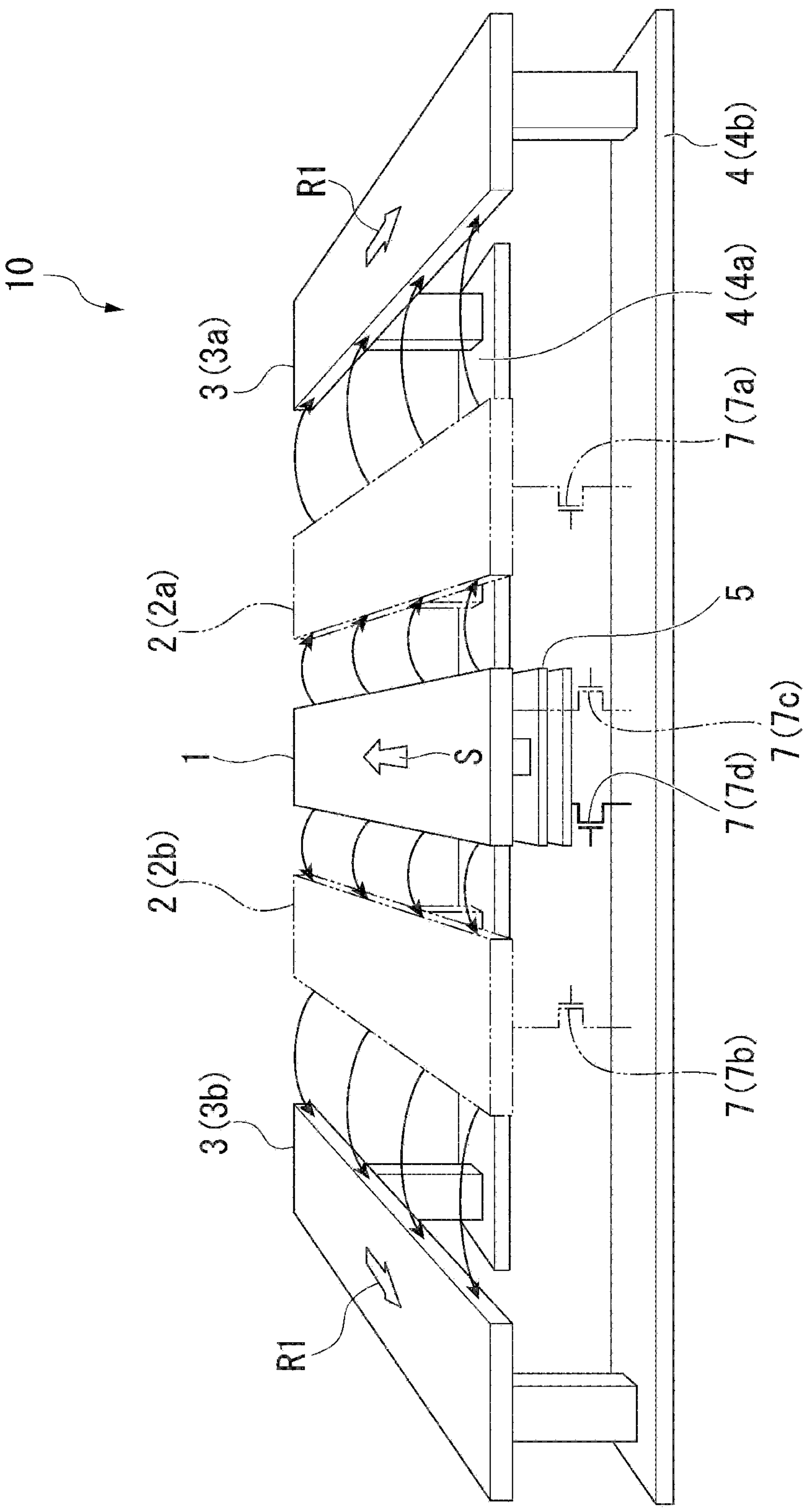
FIG. 3 is a diagram showing a high-delay mode of the digital phase shift circuit according to the first embodiment.

FIG. 3 is a diagram showing the high-delay mode of the digital phase shift circuit 10 according to the first embodiment. The high-delay mode is a mode in which a first phase difference is generated in the signal S. In the high-delay mode, as shown in FIG. 3, the electronic switch 7*a* and the electronic switch 7*b* are controlled to be in the open state and the electronic switch 7*d* is controlled to be in the closed state.

The electronic switch 7*a* is controlled to be in the open state and therefore the electrical connection between the other end of the first inner line 2*a* and the second ground conductor 4*b* is disconnected. The electronic switch 7*b* is controlled to be in the open state and therefore the electrical connection between the other end of the second inner line 2*b* and the second ground conductor 4*b* is disconnected. The electronic switch 7*d* is controlled to be in the closed state and therefore the other end of the signal line 1 is connected to the second ground conductor 4*b* via the capacitor 5.

When the signal S propagates through the signal line 1 in a direction from the input end (the other end) to the output end (one end), the return current R1 flows from the one end to the other end in a direction opposite that of the signal S. In the high-delay mode, because the electronic switch 7*a* and the electronic switch 7*b* are in the open state, the return current R1 mainly flows through the first outer line 3*a* and the second outer line 3*b* as shown in FIG. 3.

Because the return current R1 flows through the first outer line 3*a* and the second outer line 3*b* in the high-delay mode, the inductance value L is larger than that in the low-delay mode. In the high-delay mode, it is possible to obtain a delay amount larger than that in the low-delay mode. Also, because the other end of the signal line 1 and the second ground conductor 4*b* are electrically connected by the capacitor 5 when the electronic switch 7*d* is in the closed state, the capacitance value C of the digital phase shift circuit 10 is also high. Consequently, in the high-delay mode, it is possible to obtain a delay amount larger than that in the low-delay mode.

<<Low-Delay Mode>>

Figure 4:
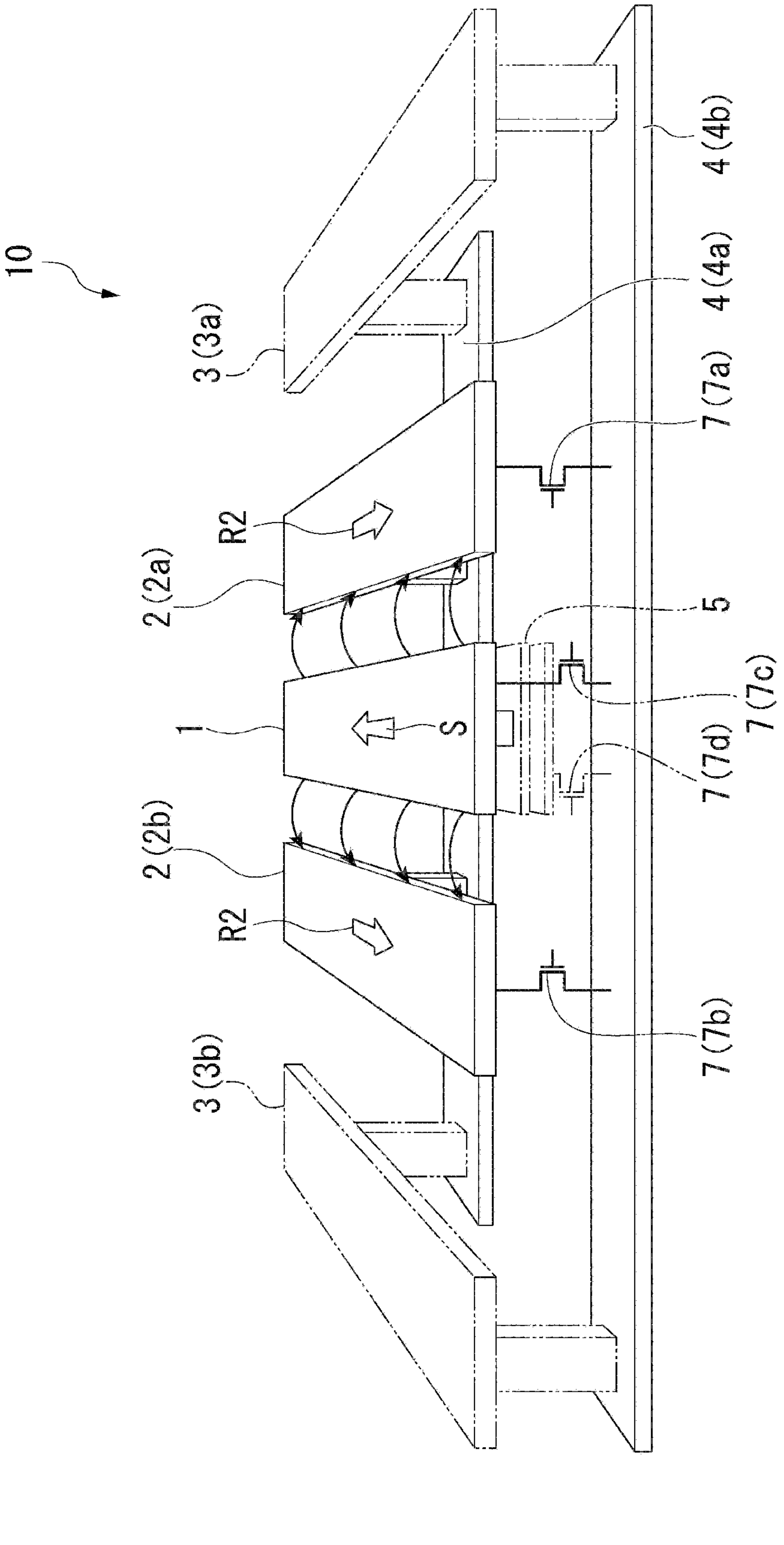
FIG. 4 is a diagram showing a low-delay mode of the digital phase shift circuit according to the first embodiment.

FIG. 4 is a diagram showing the low-delay mode of the digital phase shift circuit 10 according to the first embodiment. The low-delay mode is a mode in which a second phase difference smaller than the first phase difference is generated in the signal S. In the low-delay mode, as shown in FIG. 4, the electronic switch 7*a* and the electronic switch 7*b* are controlled to be in a closed state and the electronic switch 7*d* is controlled to be in an open state.

When the electronic switch 7*a* is controlled to be in the closed state, the other end of the first inner line 2*a* and the second ground conductor 4*b* are electrically connected. When the electronic switch 7*b* is controlled to be in the closed state, the other end of the second inner line 2*b* and the second ground conductor 4*b* are electrically connected.

When the signal S propagates through the signal line 1 in a direction from the input end (the other end) to the output end (one end), the return current R2 flows from the one end to the other end in a direction opposite that of the signal S. In the low-delay mode, because the electronic switch 7*a* and the electronic switch 7*b* are in the closed state, the return current R2 mainly flows through the first inner line 2*a* and the second inner line 2*b* as shown in FIG. 4.

Because the return current R2 flows through the first inner line 2*a* and the second inner line 2*b* in the low-delay mode, the inductance value L is smaller than that in the high-delay mode. The delay amount in the low-delay mode is smaller than the delay amount in the high-delay mode. Although the capacitor 5 is connected to the other end of the signal line 1, because the electronic switch 7*d* is in the open state, the capacitance of capacitor 5 is non-functional (invisible from the signal line 1) and there is only parasitic capacitance that is significantly less than the capacitance of the capacitor 5. Consequently, in the low-delay mode, it is possible to obtain a delay amount smaller than that in the high-delay mode.

Here, in the low-delay mode, the loss of the signal line 1 can be intentionally increased by controlling the electronic switch 7*c* to be in a closed state. This is to make the loss of the high-frequency signal in the low-delay mode be substantially equal to the loss of the high-frequency signal in the high-delay mode.

That is, the loss of the high-frequency signal in the low-delay mode is clearly less than the loss of the high-frequency signal in the high-delay mode. This loss difference causes an amplitude difference of the high-frequency signal output from the digital phase shift circuit 10 when the operation mode is switched between the low-delay mode and the high-delay mode. In relation to this circumstance, the digital phase shift circuit 10 may eliminate the above-described amplitude difference by controlling the electronic switch 7*c* to be in the closed state in the low-delay mode.

<Connection Unit>

Figure 5:
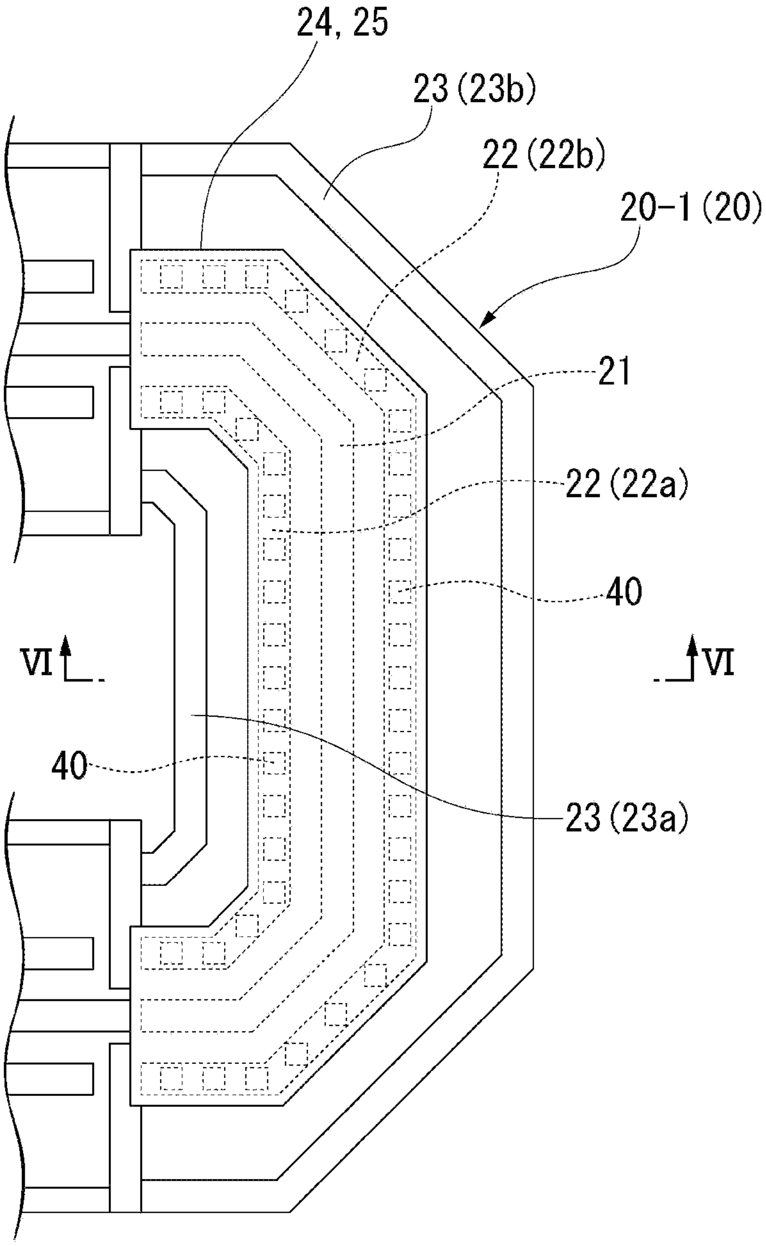
FIG. 5 is a plan view showing a connection unit according to the first embodiment.
Figure 6:
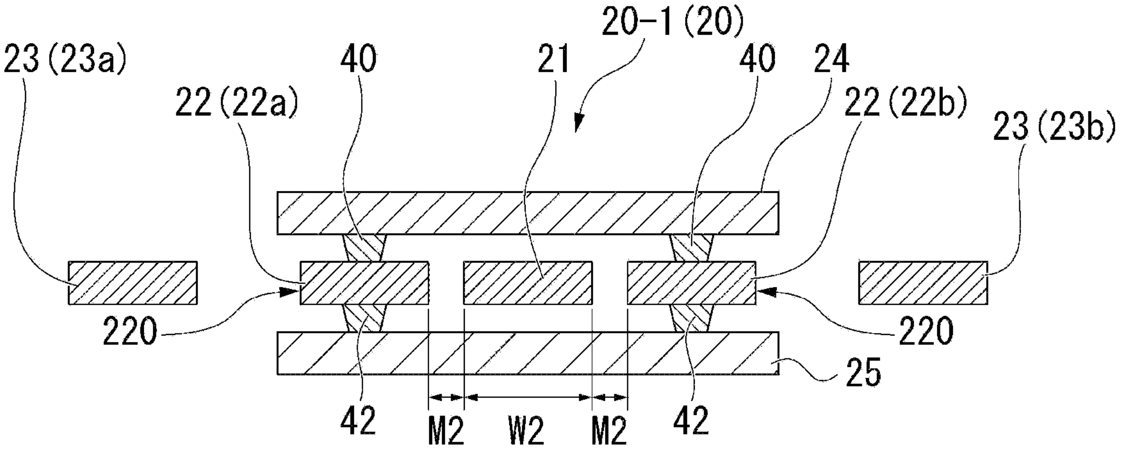
FIG. 6 is a cross-sectional view taken along line VI-VI in FIG. 5.

FIG. 5 is a plan view showing the connection unit 20 according to the first embodiment. FIG. 6 is a cross-sectional view taken along line VI-VI in FIG. 5. In addition, the digital phase shifter 100 of the present embodiment includes three connection units 20 (connection units 20-1, 20-2, and 20-3), but the connection unit 20-1 will be described here because the three connection units 20 have similar configurations. As shown in FIGS. 5 and 6, the connection unit 20-1 includes a first connection line 21, a second connection line 22, a third connection line 23, a first ground layer 24, and a second ground layer 25.

The first connection line 21 is, for example, a long plate-shaped conductor having a certain width W2, a certain thickness, and a predetermined length. The first connection line 21 is bent such that its extension direction is changed by 180° and both end portions thereof are facing the same direction. The first connection line 21 connects the signal line 1 of the digital phase shift circuit 10-10 and the signal line 1 of the digital phase shift circuit 10-11. The signal S output from the signal line 1 of the digital phase shift circuit 10-10 is input to the signal line 1 of the digital phase shift circuit 10-11 via the first connection line 21. In addition, the width W2 of the first connection line 21 may be equivalent to the width W1 of the signal line 1 or may be wider than the width W1.

The second connection line 22 is a long plate-shaped conductor having a certain width, a certain thickness, and a predetermined length. The second connection line 22 is provided parallel to the first connection line 21 and is away therefrom by a predetermined distance M2. Specifically, the second connection lines 22 are arranged on both sides of the first connection line 21 at an interval of the predetermined distance M2 from the first connection line 21. In addition, in the following description, the second connection line 22 arranged on one side of the first connection line 21 may be referred to as a "second connection line 22*a*" and the second connection line 22 arranged on the other side of the first connection line 21 may be referred to as a "second connection line 22*b*."

The predetermined distance M2 may be equivalent to the predetermined distance M1 or may be shorter than the predetermined distance M1. For example, when the predetermined distance M1 is 10 μm, the predetermined distance M2 may be set to less than 10 μm. More preferably, the predetermined distance M2 is, for example, 2.5 μm or 2 μm or less, and it is desirable to make the second connection line 22 as close as possible to the first connection line 21. In the present embodiment, the second connection line 22 may be made to approach the first connection line 21 such that the distance therebetween is the manufacturing limit or to close to the manufacturing limit.

The second connection line 22 connects the inner line 2 of the digital phase shift circuit 10-10 and the inner line 2 of the digital phase shift circuit 10-11. The second connection line 22*a* has one end connected to the first inner line 2*a* of the digital phase shift circuit 10-10 and the other end connected to the first inner line 2*a* of the digital phase shift circuit 10-11. The second connection line 22*b* has one end connected to the second inner line 2*b* of the digital phase shift circuit 10-10 and the other end connected to the second inner line 2*b* of the digital phase shift circuit 10-11.

The third connection line 23 is a strip-shaped conductor provided farther from the first connection line 21 than the second connection line 22 on both sides that are one side and the other side of the first connection line 21. The third connection line 23 is provided parallel to the first connection line 21 at an interval of a predetermined distance therefrom in a state in which the second connection line 22 is interposed between the first connection line 21 and the third connection line 23. In addition, in the following description, the third connection line 23 arranged on the one side of the first connection line 21 may be referred to as a "third connection line 23*a*" and the third connection line 23 arranged on the other side of the first connection line 21 may be referred to as a "third connection line 23*b*."

The third connection line 23 connects the outer line 3 of the digital phase shift circuit 10-10 and the outer line 3 of the digital phase shift circuit 10-11. The third connection line 23*a* has one end connected to the first outer line 3*a* of the digital phase shift circuit 10-10 and the other end connected to the first outer line 3*a* of the digital phase shift circuit 10-11. The third connection line 23*b* has one end connected to the second outer line 3*b* of the digital phase shift circuit 10-10 and the other end connected to the second outer line 3*b* of the digital phase shift circuit 10-11.

The first ground layer 24 is provided above the first connection line 21 and the second connection line 22 at an interval of a predetermined distance therefrom. The first ground layer 24 preferably has a width such that the first ground layer 24 extends to at least a side surface 220 on one side of each second connection line 22. The side surface 220 is a side surface opposite to the side where the first connection line 21 is arranged.

The first ground layer 24 is connected to each of the second connection line 22*a* and the second connection line 22*b* via via-holes 40. As shown in FIG. 5, a plurality of via-holes 40 are arrayed along the second connection line 22*a* and a plurality of via-holes 40 are arrayed along the second connection line 22*b*.

The second ground layer 25 is provided below the first connection line 21 and the second connection line 22 at an interval of a predetermined distance therefrom. The second ground layer 25 preferably has a width such that the second ground layer 25 extends to at least the side surface 220 on one side of each second connection line 22.

The second ground layer 25 is connected to each of the second connection line 22*a* and the second connection line 22*b* via via-holes 42. Similarly to the via-holes 40, a plurality of via-holes 42 are arrayed along the second connection line 22*a* and a plurality of via-holes 42 are arrayed along the second connection line 22*b*.

Figure 7:
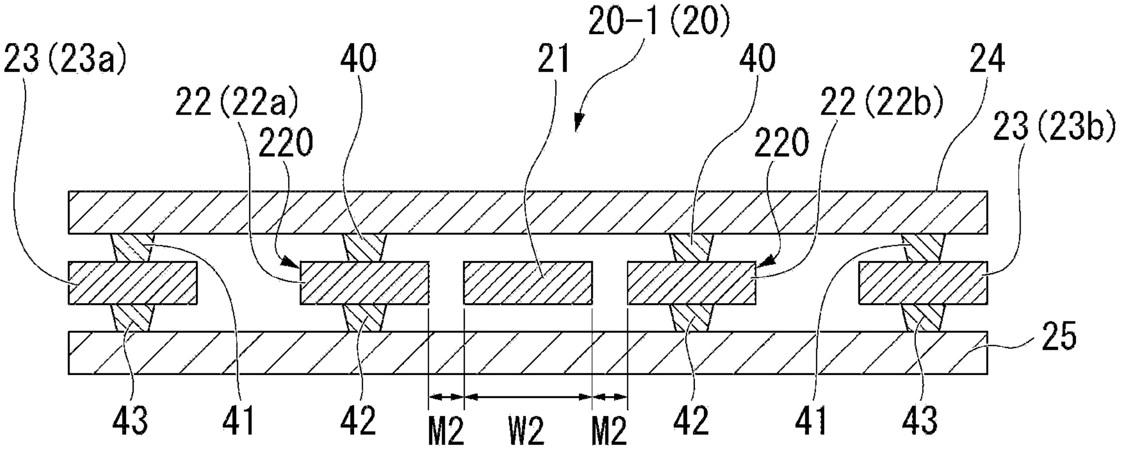
FIG. 7 is a cross-sectional view showing a modification of the connection unit according to the first embodiment.

FIG. 7 is a cross-sectional view showing a modification of the connection unit 20 according to the first embodiment. As shown in FIG. 7, the connection unit 20 may have the first ground layer 24 extending to a position above the third connection line 23 and the second ground layer 25 extending to a position below the third connection line 23.

In this modification, the first ground layer 24 is connected to each of the second connection line 22*a* and the second connection line 22*b* via the via-holes 40 and is connected to each of the third connection line 23*a* and the third connection line 23*b* via via-holes 41. In addition, in the configuration shown in FIG. 7 as an example, a plurality of via-holes 41 are arrayed along the third connection line 23*a* and a plurality of via-holes 41 are arrayed along the third connection line 23*b*.

Also, the second ground layer 25 is connected to each of the second connection line 22*a* and the second connection line 22*b* via the via-holes 42 and is connected to each of the third connection line 23*a* and the third connection line 23*b* via via-holes 43. In addition, in the configuration illustrated in FIG. 7 as an example, similarly to the via-holes 41, a plurality of via-holes 43 are arrayed along the third connection line 23*a* and a plurality of via-holes 43 are arrayed along the third connection line 23*b*.

Although the connection unit 20-1 has a first ground layer 24 and a second ground layer 25 in the example shown in FIGS. 6 and 7, the present invention is not limited thereto. At least one of the first ground layer 24 and the second ground layer 25 may be provided. That is, it is only necessary to arrange a ground layer in at least one of positions above and below the first connection line 21.

Returning to FIG. 1, the capacitor 50 is connected in parallel to the connection unit 20 having the above-described configuration. The capacitor 50 is a reactance element for averaging a distribution of phase shift amounts generated due to weak reflections occurring in preceding and following positions of the connection unit 20. The capacitor 50 is connected in parallel to an intermediate portion of each of the three connection units 20 (the connection units 20-1, 20-2, and 20-3). Also, the capacitor 50 may be connected in parallel to an intermediate portion of at least one of the three connection units 20 (the connection units 20-1, 20-2, and 20-3). The intermediate portion of the connection unit 20 is preferably an intermediate position of ½ of a total length (a total length in the extension direction) of the connection unit 20, but may be a position in the vicinity of the intermediate position. For example, the intermediate portion of the connection unit 20 may be located at any position within a middle region when the total length of the connection unit 20 is divided into three equal regions or may be preferably located at any position within a middle region when the total length of the connection unit 20 is divided into five equal regions.

The capacitor 50 is, for example, a thin film capacitor having a metal insulator metal (MIM) structure. The capacitor 50 has capacitance corresponding to a facing area of the parallel flat plates. However, the capacitor 5 may use a comb-tooth type capacitor instead of a parallel flat plate capacitor. In the capacitor 50, the upper electrode is connected to the first connection line 21 and the lower electrode is electrically grounded. In addition, the lower electrode of the capacitor 50 may be connected to any one of the first ground layer 24, the second ground layer 25, or any other ground (such as the frame ground or the like (not shown) of the digital phase shifter 100).

<Characteristics of Digital Phase Shifter>

Figure 8:
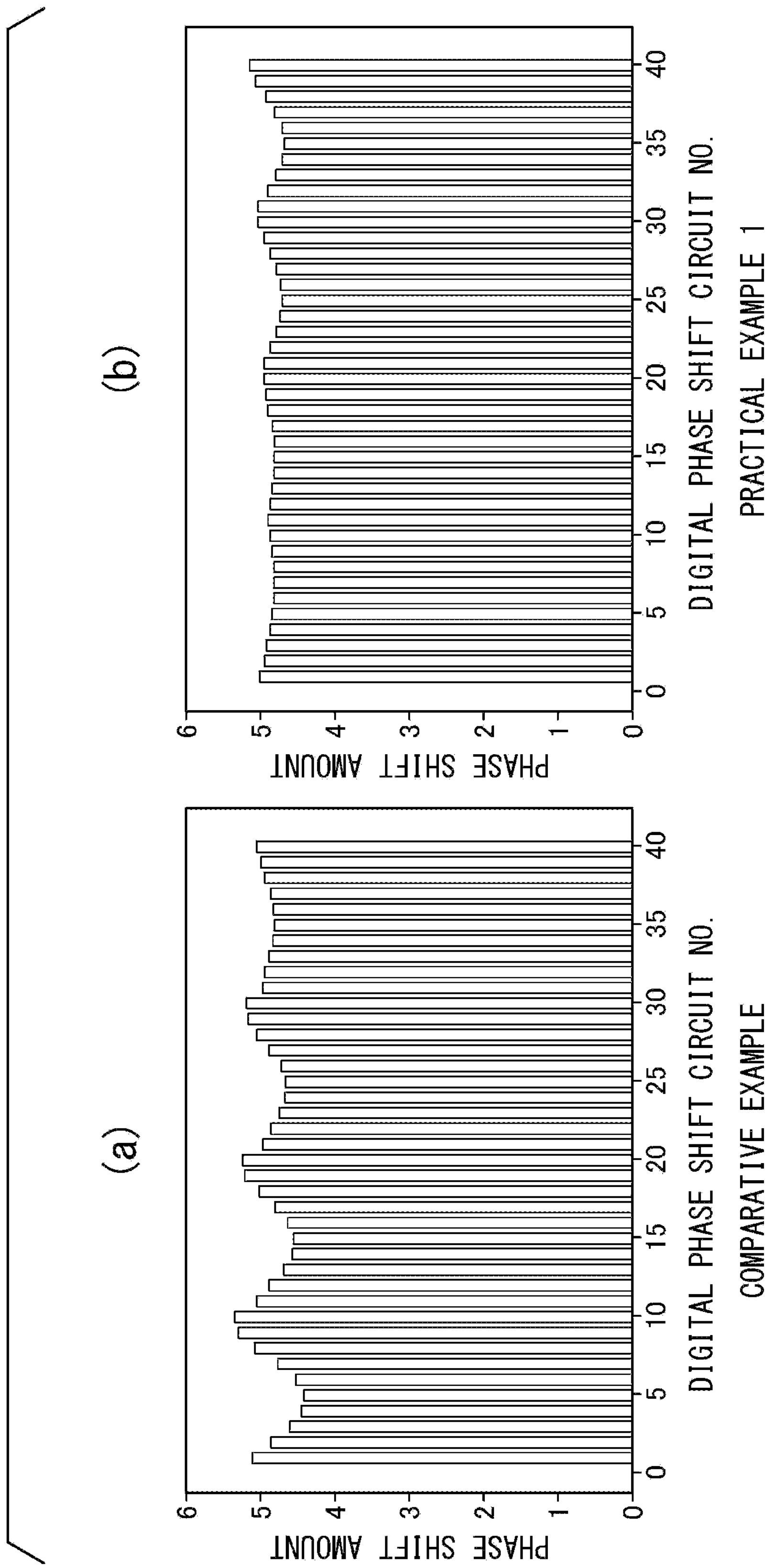
FIG. 8 is a diagram showing a distribution of phase shift amounts of the digital phase shifter according to the first embodiment.

FIG. 8 is a diagram showing a distribution of phase shift amounts of the digital phase shifter 100 according to the first embodiment. In addition, the phase shift amount distribution shown in part (a) of FIG. 8 is for a comparative example in which the capacitor 50 is removed from the digital phase shifter 100. Also, the phase shift amount distribution shown in part (b) of FIG. 8 is for the digital phase shifter 100 (practical example 1). In the graph shown in FIG. 8, the horizontal axis represents a number ("1" to "40") of the digital phase shift circuit 10 and the vertical axis represents a phase shift amount of each digital phase shift circuit 10.

The phase shift amount distribution shown in FIG. 8 is obtained when switching control to the low-delay mode is sequentially performed in the order of the digital phase shift circuits 10-1 to 10-40 from a state in which all the digital phase shift circuits 10-1 to 10-40 are set in the high-delay mode. Also, the phase shift amount distribution shown in FIG. 8 is a phase shift amount distribution of a case where the frequency of the signal S is 30 [GHz] and the capacitance of the capacitor 50 is 40 [fF]. An ideal characteristic of the digital phase shifter 100 is that the top of a graph shown in FIG. 8 is flat (that there is no distribution of phase shift amounts (there is no non-uniformity of phase shift amounts)).

In addition, the control of the digital phase shift circuits 10-1 to 10-40 starts from the digital phase shift circuit 10-1 and is performed sequentially in the connection order of the digital phase shift circuits 10-1 to 10-40. This is because the capacitor 5 in the digital phase shift circuit 10-*n* (n is an integer satisfying 1≤n≤39) is provided on (connected to) (the ground conductor of) a side opposite to the side to which the digital phase shift circuit 10-(*n*+1) is connected.

That is, among the digital phase shift circuits 10 constituting the digital phase shift circuit groups 30-1 to 30-4 connected in a meander shape, digital phase shift circuits located on an outermost side are the digital phase shift circuit 10-1 and the digital phase shift circuit 10-40. Control is started from the digital phase shift circuit 10-1 in which the capacitor 5 is provided on a side opposite to the side to which the digital phase shift circuit 10-2 is connected among the digital phase shift circuit 10-1 and the digital phase shift circuit 10-40.

First, referring to part (a) of FIG. 8, it can be seen that projection portions occur in the distribution of phase shift amounts in the digital phase shift circuits 10 (the digital phase shift circuits 10-10, 10-20, 10-30, and the like) in the vicinity of the connection unit 20.

Next, referring to part (b) of FIG. 8, it can be seen that in the digital phase shift circuits 10 (the digital phase shift circuits 10-10, 10-20, 10-30, and the like), which are in the vicinity of the connection unit 20, projection portions of the phase shift amount distribution are smaller and the phase shift amount distribution is averaged (flat (or close to flat)) as compared with part (a) of FIG. 8. Thus, it can be seen that it is desirable to connect the capacitor 50 in parallel to the intermediate portion of the connection unit 20.

The connection unit 20 includes a transmission line and characteristic impedance is dominated by a real part. On the other hand, an imaginary part in the impedance of the digital phase shift circuit group 30 in which a plurality of digital phase shift circuits 10 are connected in cascade cannot be ignored, and it is estimated that weak reflections in the connection unit 20 are caused by differences therebetween and lead to a distribution of phase shift amounts. Under this estimation, in the first embodiment, an element of an imaginary part (the capacitor 50 that is a reactance element) is introduced to a portion (an intermediate portion of the connection unit 20) assumed to be the cause. Thereby, in the first embodiment, the distribution of phase shift amounts is averaged.

As described above, the digital phase shifter 100 of the present embodiment includes a first digital phase shift circuit group (for example, the digital phase shift circuit group 30-1) in which a plurality of digital phase shift circuits 10 are connected in cascade; a second digital phase shift circuit group (for example, the digital phase shift circuit group 30-2) in which a plurality of digital phase shift circuits 10 are connected in cascade; and a bend-type connection unit (for example, the connection unit 20-1) that connects a first digital phase shift circuit (for example, the digital phase shift circuit 10-10) located at an end of the first digital phase shift circuit group and a second digital phase shift circuit (for example, the digital phase shift circuit 10-11) located at an end of the second digital phase shift circuit group.

In addition, the first digital phase shift circuit group may be any one of the digital phase shift circuit groups 30-1 to 30-4. It is only necessary for the second digital phase shift circuit group to be a digital phase shift circuit group different from the first digital phase shift circuit group. That is, the digital phase shift circuit groups 30-1 to 30-4 may correspond to the first digital phase shift circuit group or may correspond to the second digital phase shift circuit group in relation to other digital phase shift circuit groups. Also, the connection unit 20 to which the capacitor 50 is connected in parallel may be at least one of the connection units 20-1 to 20-3 as long as the first digital phase shift circuit group and the second digital phase shift circuit group are connected thereby.

Also, as shown in FIG. 2, the digital phase shift circuit 10 is a circuit that includes the signal line 1, the two inner lines 2 provided on both sides of the signal line 1, the two outer lines 3 provided outside of the two inner lines 2, the first ground conductor 4*a* connected to one end of each of the two inner lines 2 and the two outer lines 3, the second ground conductor 4*b* connected to the other end of each of the two outer lines 3, and the two electronic switches 7*a* and 7*b*, the electronic switch 7*a* being provided between the other end of one of the two inner lines 2 and the second ground conductor 4*b*, the electronic switch 7*b* being provided between the other end of the other of the two inner lines 2 and the second ground conductor 4*b* and that is set in a low-delay mode in which a return current flows through the two inner lines 2 or a high-delay mode in which a return current flows through the two outer lines 3.

In the digital phase shifter 100, the capacitor 50 is connected in parallel to the intermediate portion of the first connection line 21 of the connection unit 20. Thereby, as shown in FIG. 8, a distribution of phase shift amounts generated due to weak reflections occurring in preceding and following positions of the connection unit 20 can be averaged.

Also, the intermediate portion of the first connection line 21 is preferably an intermediate position of ½ of a total length (a total length in the extension direction) of the first connection line 21, but may be in the vicinity of the intermediate position. For example, the intermediate portion of the first connection line 21 may be located at any position within a middle region when the total length of the first connection line 21 is divided into three equal regions or may be preferably located at any position within a middle region when the total length of the first connection line 21 is divided into five equal regions.

Second Embodiment

Next, a second embodiment of the present invention will be described. In the following description, components identical or equivalent to those of the above-described embodiment are denoted by the same reference signs, and the description thereof is simplified or omitted.

<Digital Phase Shifter>

Figure 9:
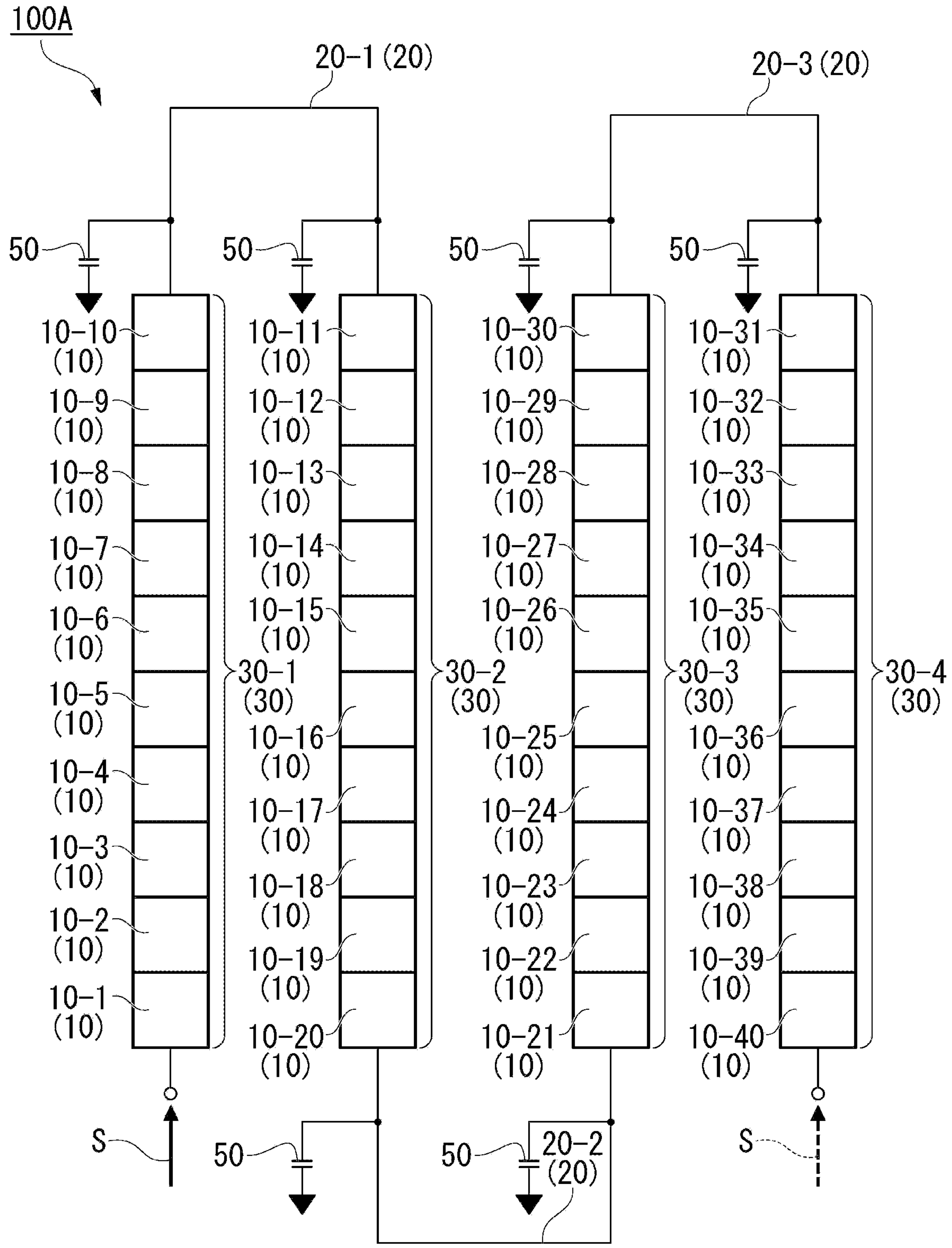
FIG. 9 is a circuit diagram showing a digital phase shifter according to a second embodiment.

FIG. 9 is a circuit diagram showing a digital phase shifter 100A according to the second embodiment. As shown in FIG. 9, the digital phase shifter 100A in the second embodiment is different from the above-described embodiment in that the capacitor 50 is connected in parallel to both end portions of the connection unit 20.

Specifically, in the connection unit 20-1, the capacitor 50 is connected in parallel to each of one end portion thereof on the digital phase shift circuit 10-10 side and the other end portion thereof on the digital phase shift circuit 10-11 side. In other words, in the first connection line 21 of the connection unit 20-1, the capacitor 50 is connected in parallel to each of one end portion thereof on the digital phase shift circuit 10-10 side and the other end portion thereof on the digital phase shift circuit 10-11 side.

One end portion of the connection unit 20-1 is preferably a connection position (contact) between the connection unit 20-1 and the digital phase shift circuit 10-10, but may be in the vicinity of the connection position. For example, one end portion of the connection unit 20-1 may be any position in a region on the digital phase shift circuit 10-side when the total length of the connection unit 20-1 is divided into three equal regions or may be preferably located at any position in a region closest to the digital phase shift circuit 10-10 side when the total length of the connection unit 20-1 is divided into five equal regions.

One end portion of the first connection line 21 is preferably a connection position (contact) between the first connection line 21 and the digital phase shift circuit 10-10, but may be in the vicinity of the connection position. For example, one end portion of the first connection line 21 may be any position in a region on the digital phase shift circuit 10-10 side when the total length of the first connection line 21 (the total length in the extension direction) is divided into three equal regions or may be preferably located at any position in a region closest to the digital phase shift circuit 10-10 side when the total length of the first connection line 21 is divided into five equal regions.

Also, the other end portion of the connection unit 20-1 is preferably a connection position (contact) between the connection unit 20-1 and the digital phase shift circuit 10-11, but may be in the vicinity of the connection position. For example, the other end portion of the connection unit 20 may be any position in a region on the digital phase shift circuit 10-11 side when the total length of the connection unit 20-1 is divided into three equal regions or may be preferably located at any position in a region closest to the digital phase shift circuit 10-11 side when the total length of the connection unit 20-1 is divided into five equal regions.

The other end portion of the first connection line 21 is preferably a connection position (contact) between the first connection line 21 and the digital phase shift circuit 10-11, but may be in the vicinity of the connection position. For example, the other end portion of the connection unit 20 may be any position in a region on the digital phase shift circuit 10-11 side when the total length of the first connection line 21 is divided into three equal regions or may be preferably located at any position in a region closest to the digital phase shift circuit 10-11 side when the total length of the first connection line 21 is divided into five equal regions.

Likewise, in the connection unit 20-2, the capacitor 50 is connected in parallel to each of one end portion thereof on the digital phase shift circuit 10-20 side and the other end portion thereof on the digital phase shift circuit 10-21 side. Also, likewise, in the connection unit 20-3, the capacitor 50 is connected in parallel to each of one end portion thereof on the digital phase shift circuit 10-30 side and the other end portion thereof on the digital phase shift circuit 10-31 side.

<Characteristics of Digital Phase Shifter>

Figure 10:
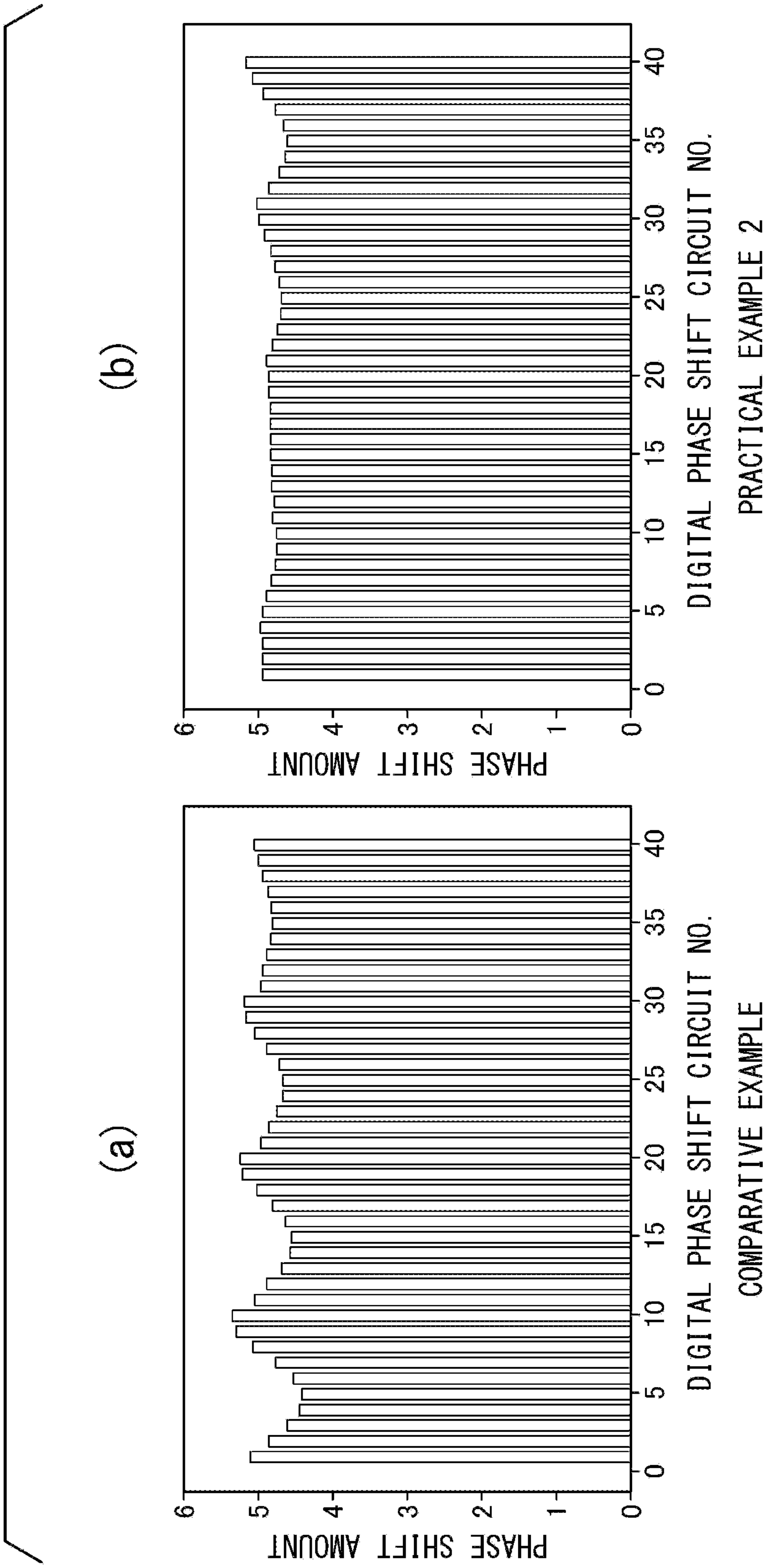
FIG. 10 is a diagram showing a distribution of phase shift amounts of the digital phase shifter according to the second embodiment.

FIG. 10 is a diagram showing a distribution of phase shift amounts of the digital phase shifter 100A according to the second embodiment. In addition, the phase shift amount distribution shown in part (a) of FIG. 10 is for a comparative example in which the capacitor 50 is removed from the digital phase shifter 100A. Also, the phase shift amount distribution shown in part (b) of FIG. 10 is for the digital phase shifter 100A (practical example 2). Other conditions are similar to those of FIG. 8.

First, referring to part (a) of FIG. 10, it can be seen that projection portions occur in the distribution of phase shift amounts in the digital phase shift circuits 10 (the digital phase shift circuits 10-10, 10-20, 10-30, and the like) in the vicinity of the connection unit 20.

Next, referring to part (b) of FIG. 10, it can be seen that in the digital phase shift circuits 10 (the digital phase shift circuits 10-10, 10-20, 10-30, and the like), which are in the vicinity of the connection unit 20, projection portions of the phase shift amount distribution is smaller and the phase shift amount distribution is averaged (flat (or close to flat)) as compared with part (a) of FIG. 10. Thus, it can be seen that it is desirable to connect the capacitor 50 in parallel to both end portions of the connection unit 20.

As described above, in the digital phase shifter 100A of the second embodiment, the capacitor 50 is connected in parallel to each of one end portion of the connection unit 20 (for example, the connection unit 20-1) on the first digital phase shift circuit (for example, the digital phase shift circuit 10-10) side and the other end portion of the connection unit 20 on the second digital phase shift circuit (for example, the digital phase shift circuit 10-11) side. Thus, it is possible to average a distribution of phase shift amounts by introducing an element of an imaginary part (the capacitor 50 that is a reactance element) to a portion assumed to be a cause of occurrence of weak reflections in the connection unit 20 (both end portions of the connection unit 20).

Third Embodiment

Next, a third embodiment of the present invention will be described. In the following description, components identical or equivalent to those of the above-described embodiments are denoted by the same reference signs, and the description thereof is simplified or omitted.

<Digital Phase Shifter>

Figure 11:
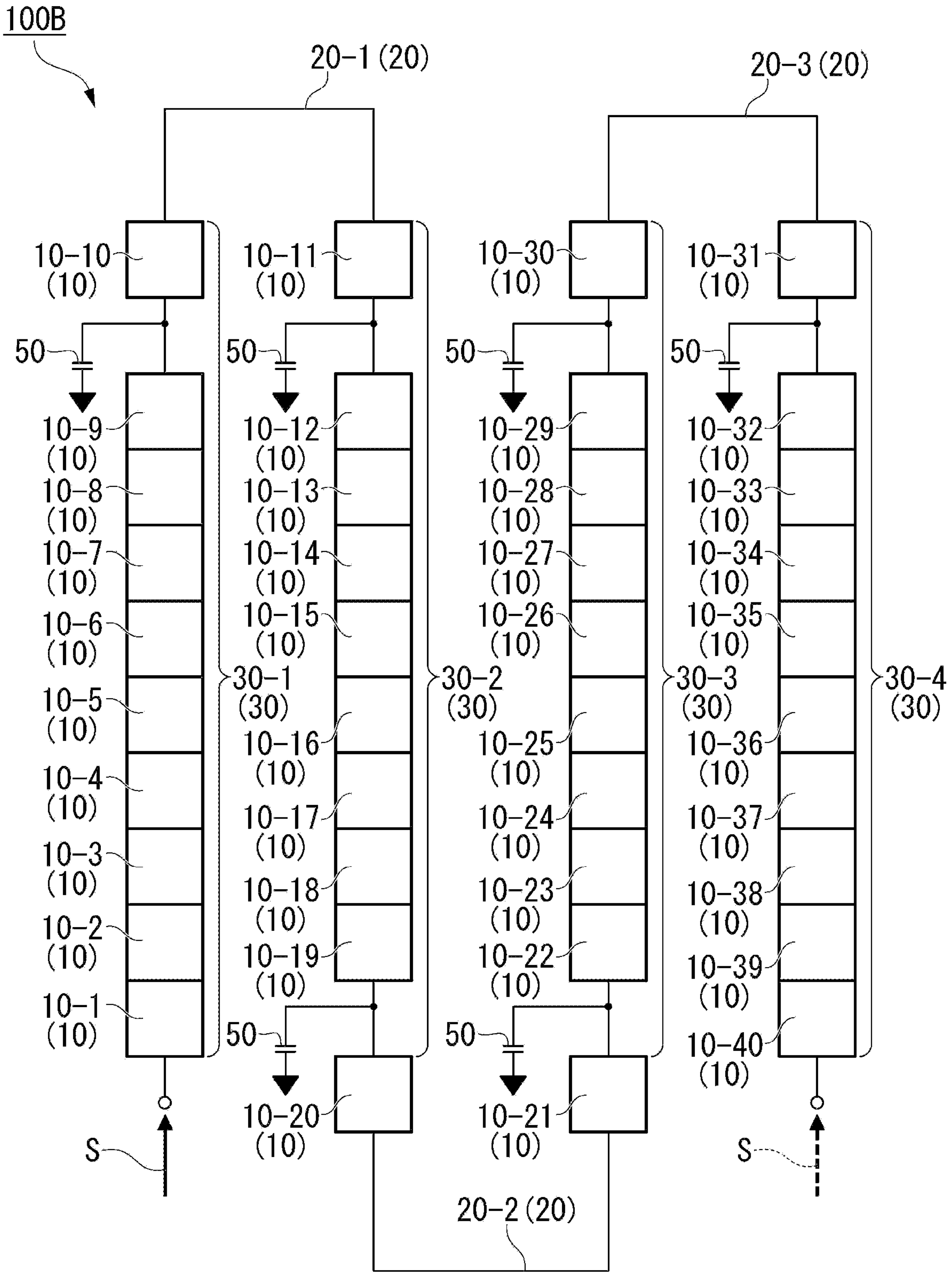
FIG. 11 is a circuit diagram showing a digital phase shifter according to a third embodiment.

FIG. 11 is a circuit diagram showing a digital phase shifter 100B according to the third embodiment. The digital phase shifter 100B in the third embodiment as shown in FIG. 11 is different from that in the above-described embodiments in that the capacitor 50 is connected in parallel to a position between a first digital phase shift circuit 10 as viewed from the connection unit 20 and connected with the connection unit 20 and a second digital phase shift circuit 10 adjacent to the first digital phase shift circuit 10.

Specifically, in the digital phase shift circuit group 30-1, the capacitor 50 is connected in parallel to a position between the digital phase shift circuit 10-10 connected to the connection unit 20-1 and the digital phase shift circuit 10-9 adjacent to the digital phase shift circuit 10-10.

Although a position between the digital phase shift circuit 10-10 and the digital phase shift circuit 10-9 is preferably a connection position (contact) between the signal line 1 of the digital phase shift circuit 10-10 and the signal line 1 of the digital phase shift circuit 10-9, the position may be in the vicinity of the connection position. For example, a position between the digital phase shift circuit 10-10 and the digital phase shift circuit 10-9 may be a signal line 1 on the digital phase shift circuit 10-10 side slightly shifted from the connection position to the digital phase shift circuit 10-10 side or a signal line 1 on the digital phase shift circuit 10-9 side slightly shifted from the connection position to the digital phase shift circuit 10-9 side. In other words, the vicinity of the connection position between the signal lines 1 of the digital phase shift circuit 10-10 and the digital phase shift circuit 10-9 may be the end portion of the signal line 1 of the digital phase shift circuit 10-10 closer to the digital phase shift circuit 10-9 or the end portion of the signal line 1 of the digital phase shift circuit 10-9 closer to of the digital phase shift circuit 10-10. Also, if the signal line 1 of the digital phase shift circuit 10-10 and the signal line 1 of the digital phase shift circuit 10-9 are connected by a transmission line (not shown), the vicinity of the connection position may be the transmission line.

Likewise, in the digital phase shift circuit group 30-2, the capacitor 50 is connected in parallel to a position between the digital phase shift circuit 10-11 connected to the connection unit 20-1 and the digital phase shift circuit 10-12 adjacent to the digital phase shift circuit 10-11. Further, in the digital phase shift circuit group 30-2, the capacitor 50 is connected in parallel to a position between the digital phase shift circuit 10-20 connected to the connection unit 20-2 and the digital phase shift circuit 10-19 adjacent to the digital phase shift circuit 10-20.

The connection position of the signal lines 1 of the two adjacent digital phase shift circuits 10 and a position in the vicinity of the connection position in the digital phase shift circuit group 30-2 (the second digital phase shift circuit group) may be similar to those in the digital phase shift circuit group 30-1 (the first digital phase shift circuit group) described above.

Likewise, in the digital phase shift circuit group 30-3, the capacitor 50 is connected in parallel to a position between the digital phase shift circuit 10-21 connected to the connection unit 20-2 and the digital phase shift circuit 10-22 adjacent to the digital phase shift circuit 10-21. Further, in the digital phase shift circuit group 30-3, the capacitor 50 is connected in parallel to a position between the digital phase shift circuit 10-30 connected to the connection unit 20-3 and the digital phase shift circuit 10-29 adjacent to the digital phase shift circuit 10-30.

Likewise, in the digital phase shift circuit group 30-4, the capacitor 50 is connected in parallel to a position between the digital phase shift circuit 10-31 connected to the connection unit 20-3 and the digital phase shift circuit 10-32 adjacent to the digital phase shift circuit 10-31.

<Characteristics of Digital Phase Shifter>

Figure 12:
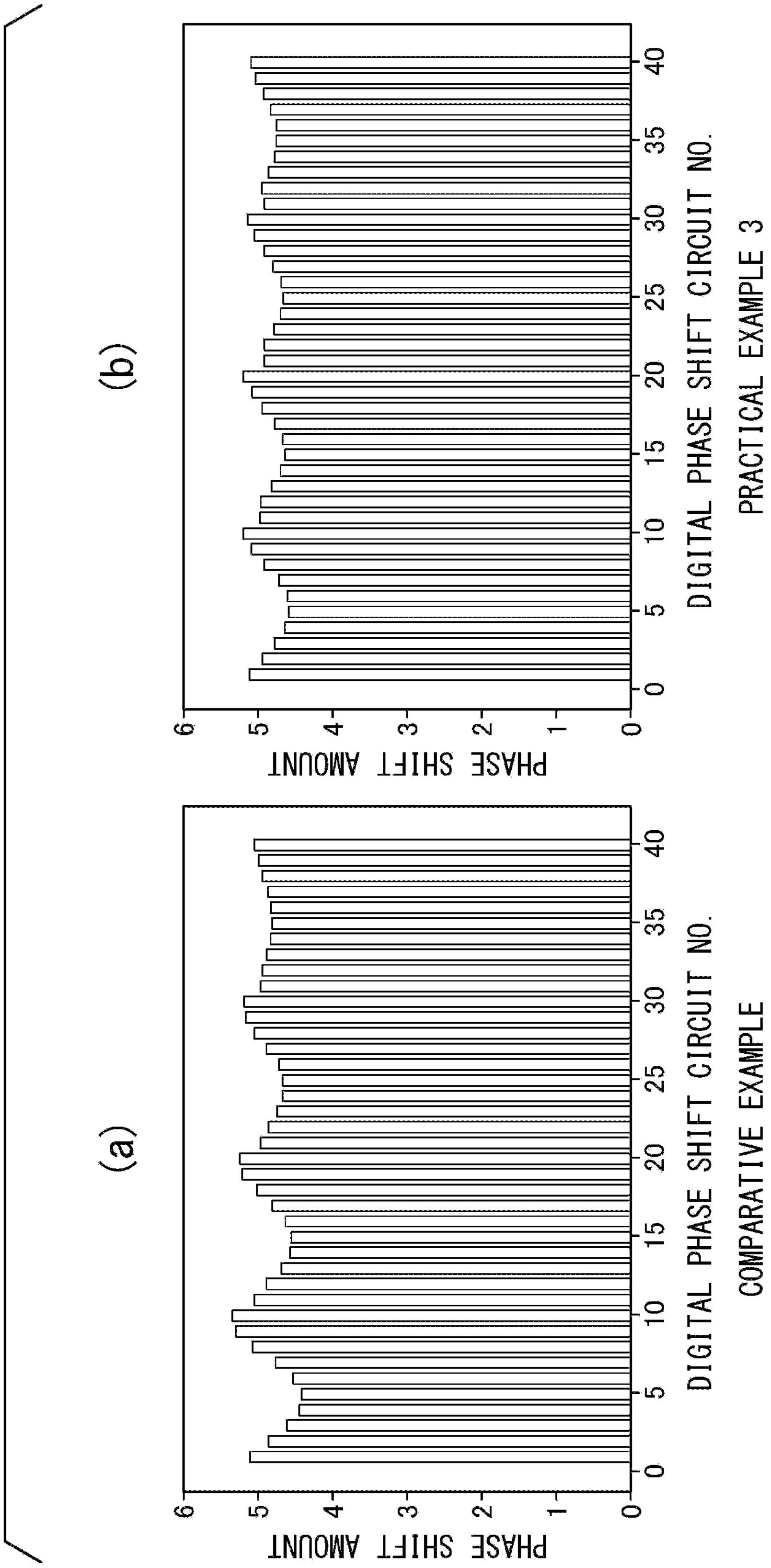
FIG. 12 is a diagram showing a distribution of phase shift amounts of the digital phase shifter according to the third embodiment.

FIG. 12 is a diagram showing a distribution of phase shift amounts of the digital phase shifter 100B according to the third embodiment. In addition, the phase shift amount distribution shown in part (a) of FIG. 12 is for a comparative example in which the capacitor 50 is removed from the digital phase shifter 100B. Also, the phase shift amount distribution shown in part (b) of FIG. 12 is for the digital phase shifter 100B (practical example 3). Other conditions are similar to those of FIG. 8.

First, referring to part (a) of FIG. 12, it can be seen that projection portions occur in the distribution of phase shift amounts in the digital phase shift circuits 10 (the digital phase shift circuits 10-10, 10-20, 10-30, and the like) in the vicinity of the connection units 20.

Next, referring to part (b) of FIG. 12, it can be seen that in the digital phase shift circuits 10 (the digital phase shift circuits 10-10, 10-20, 10-30, and the like) in the vicinity of the connection units 20, the projection portions of the distribution of phase shift amounts are smaller and the distribution of phase shift amounts is averaged (a recess and projection difference is smaller) as compared with that in part (a) of FIG. 12. For this reason, it can be seen that it is desirable to connect the capacitor 50 in parallel to a position between the cells of the first and second digital phase shift circuits 10 adjacent to the connection unit 20.

As described above, in the digital phase shifter 100B of the third embodiment, the capacitor 50 is connected in parallel to each of a position between the first digital phase shift circuit (for example, the digital phase shift circuit 10-10) and the third digital phase shift circuit (for example, the digital phase shift circuit 10-9) adjacent to the first digital phase shift circuit, which are the digital phase shift circuits 10 included in the first digital phase shift circuit group (for example, the digital phase shift circuit group 30-1), and a position between the second digital phase shift circuit (for example, the digital phase shift circuit 10-11) and the fourth digital phase shift circuit (for example, the digital phase shift circuit 10-12) adjacent to the second digital phase shift circuit, which are the digital phase shift circuits 10 included in the second digital phase shift circuit group (for example, the digital phase shift circuit group 30-2). According to this configuration, it is possible to average a distribution of phase shift amounts by introducing an element of an imaginary part (the capacitor 50 that is the reactance element) to a portion assumed to be a cause of occurrence of weak reflections in the connection unit 20 (position between the cells of the first and second digital phase shift circuits 10 when seen from the connection unit 20).

Also, in the present embodiment, the capacitor 50 may be connected in parallel to at least one of a position between the first digital phase shift circuit (for example, the digital phase shift circuit 10-10) and the third digital phase shift circuit (for example, the digital phase shift circuit 10-9) adjacent to the first digital phase shift circuit, which are the digital phase shift circuits 10 included in the first digital phase shift circuit group (for example, the digital phase shift circuit group 30-1), and a position between the second digital phase shift circuit (for example, the digital phase shift circuit 10-11) and the fourth digital phase shift circuit (for example, the digital phase shift circuit 10-12) adjacent to the second digital phase shift circuit, which are the digital phase shift circuits included in the second digital phase shift circuit group (for example, the digital phase shift circuit group 30-2).

Fourth Embodiment

Next, a fourth embodiment of the present invention will be described. In the following description, components identical or equivalent to those of the above-described embodiments are denoted by the same reference signs, and the description thereof is simplified or omitted.

Figure 13:
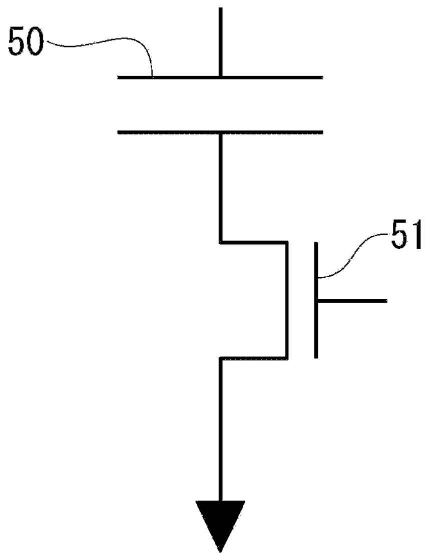
FIG. 13 is a circuit diagram around a capacitor according to a fourth embodiment.

FIG. 13 is a circuit diagram around a capacitor 50 according to the fourth embodiment. In the fourth embodiment, as shown in FIG. 13, an electronic switch 51 is provided on a lower electrode side of the capacitor 50 for averaging a distribution of phase shift amounts. Also, the electronic switch 51 may be provided on an upper electrode side of the capacitor 50. The electronic switch 51 shown in FIG. 13 is connected in series with the capacitor 50 between the lower electrode of the capacitor 50 and the ground. The electronic switch 51 is, for example, a MOS-type FET. In the example shown in FIG. 13, the electronic switch 51 has a drain terminal connected to the lower electrode of the capacitor 50, a source terminal connected to the ground, and a gate terminal connected to the switch controller 8 (see FIG. 2).

The electronic switch 51 is controlled to be in a closed state or an open state on the basis of a gate signal input from the switch controller 8 to the gate terminal. The electronic switch 51 makes the lower electrode of the capacitor 50 and the ground be in an electrically connected state in which they are electrically connected or in an electrically disconnected state in which the electrical connection is disconnected by a control process of the switch controller 8. The electronic switch 51 may be a bipolar transistor (BJT) or the like.

Thus, in the fourth embodiment, an electronic switch 51 configured to switch between whether or not to ground one end side (lower electrode side) of the capacitor 50 is provided. The electronic switch 51 is turned ON (closed state) when the desired frequency band of the signal S is a first frequency band and is turned OFF (open state) when the desired frequency band is a second frequency band, thereby enabling the effect of the capacitor 50 to be appropriately exhibited in accordance with each desired frequency band.

Fifth Embodiment

Next, a fifth embodiment of the present invention will be described. In the following description, components identical or equivalent to those of the above-described embodiments are denoted by the same reference signs, and the description thereof is simplified or omitted.

In the fifth embodiment, in order to further mitigate a projection portion or a recess portion of the above-described distribution of phase shift amounts, at least one of the above-described digital phase shift circuits 10-1 to 10-40 is a mitigation circuit RC for mitigating a distribution of phase shift amounts generated due to weak reflections occurring in preceding and following positions of the connection unit 20.

As will be described below, the mitigation circuit RC includes a first mitigation circuit RC1 and a second mitigation circuit RC2. The first mitigation circuit RC1 is a digital phase shift circuit 10 having a large phase shift amount as compared with the digital phase shift circuit 10 other than the mitigation circuit RC (the first mitigation circuit RC1 and the second mitigation circuit RC2) and is a circuit for mitigating a recess portion of the above-described distribution of phase shift amounts. The second mitigation circuit RC2 is a digital phase shift circuit 10 having a small phase shift amount as compared with the digital phase shift circuit 10 other than the mitigation circuit RC (the first mitigation circuit RC1 and the second mitigation circuit RC2) and is a circuit for mitigating a projection portion of the above-described distribution of phase shift amounts.

For example, in the case of part (b) of FIG. 8, the digital phase shift circuit 10-40 may be the second mitigation circuit RC2. Also, the digital phase shift circuit 10-25 may be the first mitigation circuit RC1. A specific configuration of the mitigation circuit RC (the first mitigation circuit RC1 and the second mitigation circuit RC2) will be described below.

<Mitigation Circuit>

<<First Mitigation Circuit>>

Figure 14:
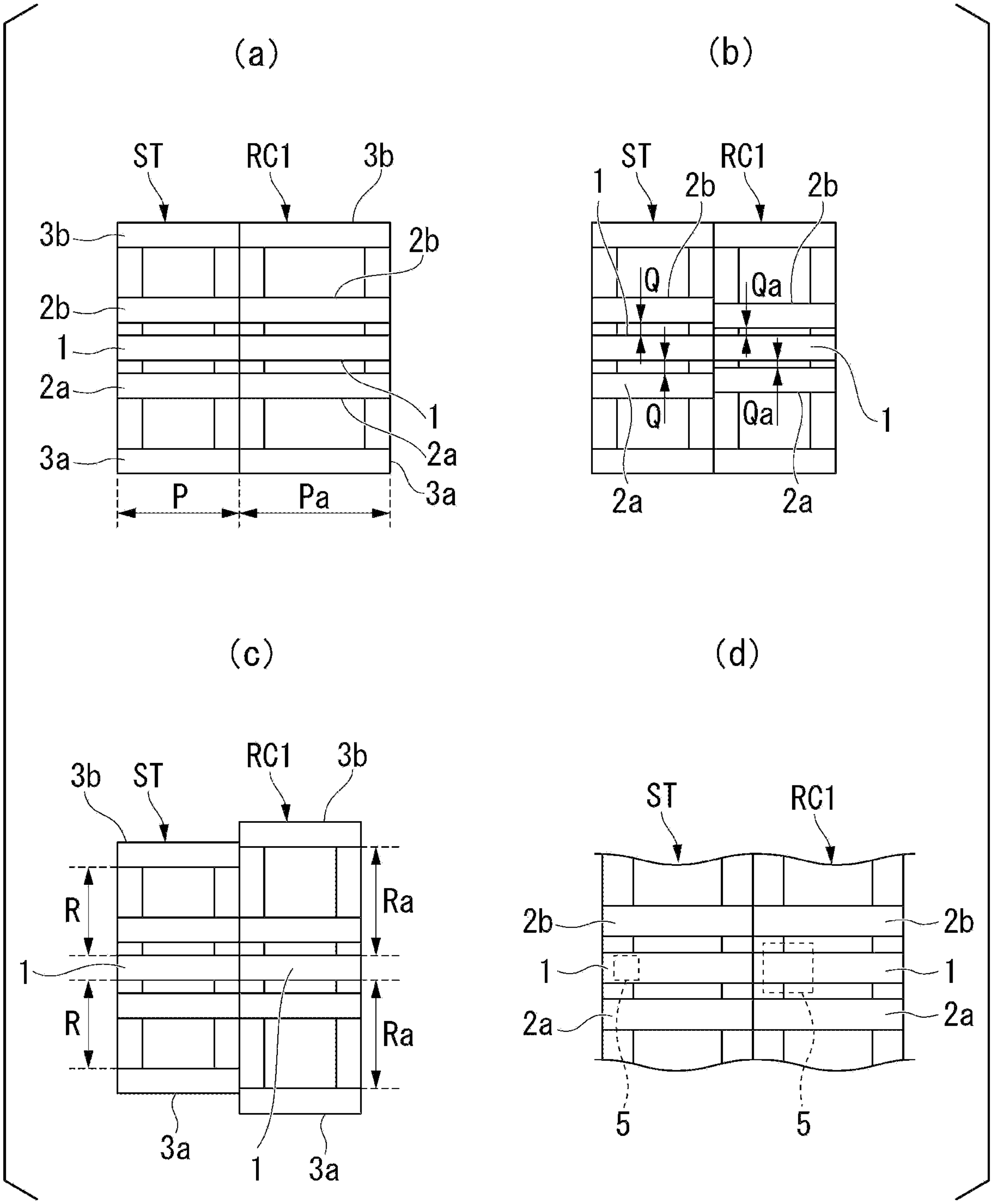
FIG. 14 is a diagram showing a first mitigation circuit of mitigation circuits according to a fifth embodiment.

FIG. 14 is a diagram showing the first mitigation circuit RC1 of the mitigation circuits RC according to the fifth embodiment. The basic configuration of the first mitigation circuit RC1 is substantially similar to the digital phase shift circuit 10 (hereinafter referred to as a "standard digital phase shift circuit ST") other than the mitigation circuit RC (the first mitigation circuit RC1 and the second mitigation circuit RC2). However, the configuration of the first mitigation circuit RC1 is slightly different from that of the standard digital phase shift circuit ST such that the first mitigation circuit RC1 has a larger phase shift amount than the standard digital phase shift circuit ST.

Specifically, the first mitigation circuit RC1 has a configuration that satisfies at least one of the conditions listed below.

Condition 1: The length of the first mitigation circuit RC1 (the length in the extension direction of the signal line 1) is longer than that of the standard digital phase shift circuit ST.

Condition 2: The distance between the signal line 1 and the inner line 2 in the first mitigation circuit RC1 is shorter than that in the standard digital phase shift circuit ST.

Condition 3: The distance between the signal line 1 and the outer line 3 in the first mitigation circuit RC1 is longer than that in the standard digital phase shift circuit ST.

Condition 4: The capacitor 5 of the first mitigation circuit RC1 is larger than that of the standard digital phase shift circuit ST.

Condition 5: The electronic switches 7*a* and 7*b* of the first mitigation circuit RC1 are larger than those of the standard digital phase shift circuit ST.

Part (a) of FIG. 14 is a diagram showing the first mitigation circuit RC1 satisfying the above "condition 1." A length Pa of the first mitigation circuit RC1 shown in part (a) of FIG. 14 (the length of the signal line 1, the inner line 2, the outer line 3, or the like) is longer than a length P of the standard digital phase shift circuit ST.

Part (b) of FIG. 14 is a diagram showing the first mitigation circuit RC1 satisfying the above-described "condition 2." A distance Qa between the signal line 1 and the inner line 2 (the first inner line 2*a* and the second inner line 2*b*) in the first mitigation circuit RC1 shown in part (b) of FIG. 14 is shorter than a distance Q between the signal line 1 and the inner line 2 (the first inner line 2*a* and the second inner line 2*b*) in the standard digital phase shift circuit ST.

Part (c) of FIG. 14 is a diagram showing the first mitigation circuit RC1 satisfying the above-described "condition 3." A distance Ra between the signal line 1 and the outer line 3 (the first outer line 3*a* and the second outer line 3*b*) in the first mitigation circuit RC1 shown in part (c) of FIG. 14 is longer than a distance R between the signal line 1 and the outer line 3 (the first outer line 3*a* and the second outer line 3*b*) in the standard digital phase shift circuit ST.

Part (d) of FIG. 14 is a diagram showing the first mitigation circuit RC1 satisfying the above-described "condition 4." A size of the capacitor 5 in the first mitigation circuit RC1 shown in part (d) of FIG. 14 is larger than that of the capacitor 5 in the standard digital phase shift circuit ST. Although not shown, sizes of the electronic switch 7*a* and the electronic switch 7*b* (see FIGS. 2 to 4) of the first mitigation circuit RC1 satisfying the above-described "condition 5" are larger than those of the electronic switch 7*a* and the electronic switch 7*b* of the standard digital phase shift circuit ST.

As described above, the first mitigation circuit RC1 has a larger phase shift amount than the standard digital phase shift circuit ST. Thus, it is possible to increase the phase shift amount using the first mitigation circuit RC1 instead of the standard digital phase shift circuit ST. Therefore, for example, when a distribution of phase shift amounts caused by weak reflections occurring in preceding and following positions of the connection unit 20 has a recess portion, the first mitigation circuit RC1 can be used to mitigate the recess portion.

<<Second Mitigation Circuit>>

Figure 15:
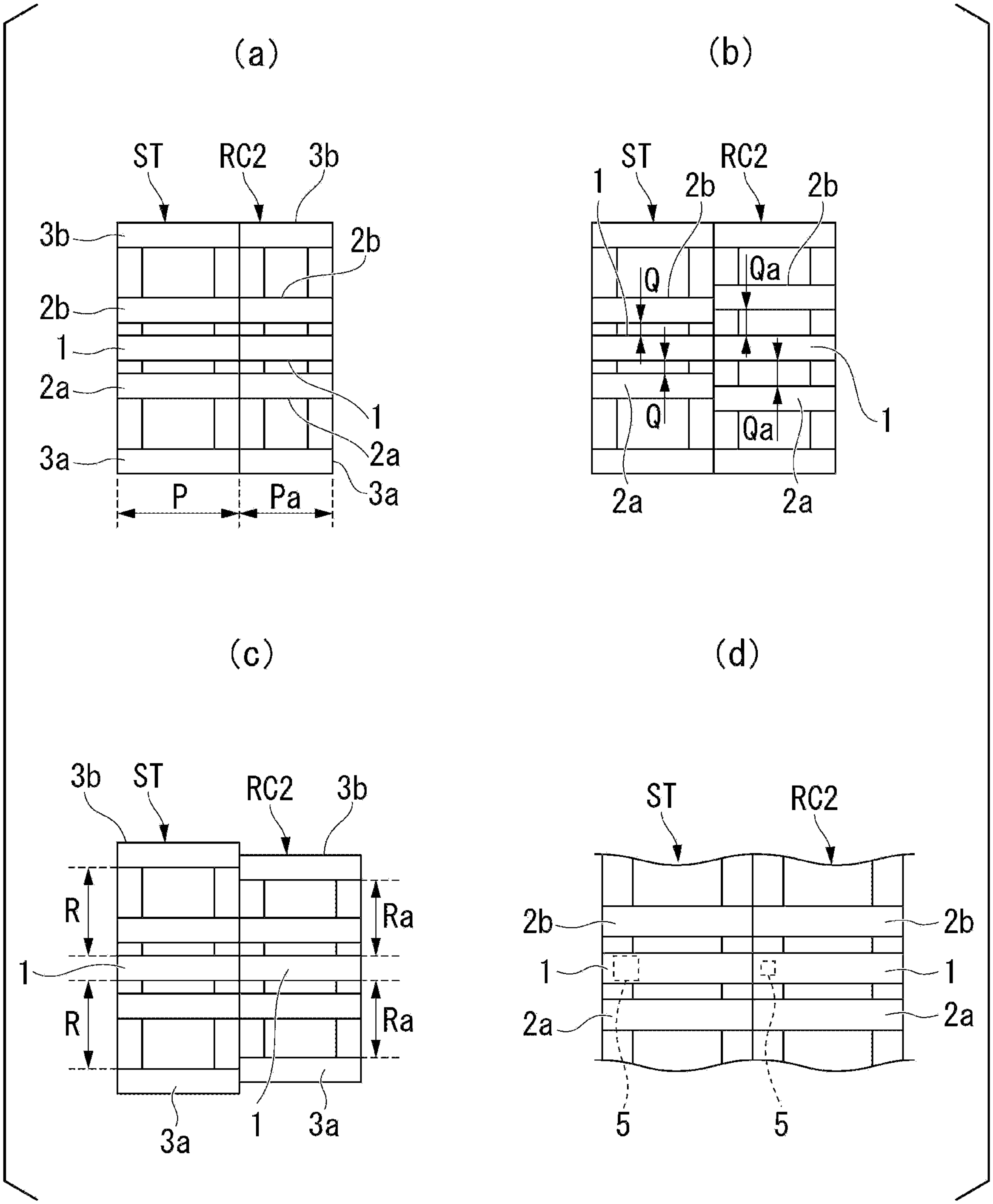
FIG. 15 is a diagram showing a second mitigation circuit of the mitigation circuits according to the fifth embodiment.

FIG. 15 is a diagram showing the second mitigation circuit RC2 of the mitigation circuits RC according to the fifth embodiment. A basic configuration of the second mitigation circuit RC2 is substantially similar to that of the standard digital phase shift circuit ST similarly to the first mitigation circuit RC1. However, a configuration of the second mitigation circuit RC2 is slightly different from that of the standard digital phase shift circuit ST such that the second mitigation circuit RC2 has a smaller phase shift amount than the standard digital phase shift circuit ST.

Specifically, the second mitigation circuit RC2 has a configuration that satisfies at least one of the conditions listed below.

Condition 1: The length of the second mitigation circuit RC2 (the length in the extension direction of the signal line 1) is shorter than that of the standard digital phase shift circuit ST.

Condition 2: The distance between the signal line 1 and the inner line 2 in the second mitigation circuit RC2 is longer than that in the standard digital phase shift circuit ST.

Condition 3: The distance between the signal line 1 and the outer line 3 in the second mitigation circuit RC2 is shorter than that in the standard digital phase shift circuit ST.

Condition 4: The capacitor 5 of the second mitigation circuit RC2 is smaller than that of the standard digital phase shift circuit ST.

Condition 5: The electronic switches 7*a* and 7*b* of the second mitigation circuit RC2 are smaller than those of the standard digital phase shift circuit ST.

Part (a) of FIG. 15 is a diagram showing the second mitigation circuit RC2 satisfying the above "condition 1." A length Pa of the second mitigation circuit RC2 shown in part (a) of FIG. 15 (the length of the signal line 1, the inner line 2, the outer line 3, or the like) is shorter than a length P of the standard digital phase shift circuit ST.

Part (b) of FIG. 15 is a diagram showing the second mitigation circuit RC2 satisfying the above-described "condition 2." A distance Qa between the signal line 1 and the inner line 2 (the first inner line 2*a* and the second inner line 2*b*) in the second mitigation circuit RC2 shown in part (b) of FIG. 15 is longer than a distance Q between the signal line 1 and the inner line 2 (the first inner line 2*a* and the second inner line 2*b*) in the standard digital phase shift circuit ST.

Part (c) of FIG. 15 is a diagram showing the second mitigation circuit RC2 satisfying the above-described "condition 3." A distance Ra between the signal line 1 and the outer line 3 (the first outer line 3*a* and the second outer line 3*b*) in the second mitigation circuit RC2 shown in part (c) of FIG. 15 is shorter than a distance R between the signal line 1 and the outer line 3 (the first outer line 3*a* and the second outer line 3*b*) in the standard digital phase shift circuit ST.

Part (d) of FIG. 15 is a diagram showing the second mitigation circuit RC2 satisfying the above-described "condition 4." A size of the capacitor 5 in the second mitigation circuit RC2 shown in part (d) of FIG. 15 is smaller than that of the capacitor 5 in the standard digital phase shift circuit ST. Although not shown, sizes of the electronic switch 7*a* and the electronic switch 7*b* (see FIGS. 2 to 4) of the second mitigation circuit RC2 satisfying the above-described "condition 5" are smaller than those of the electronic switch 7*a* and the electronic switch 7*b* of the standard digital phase shift circuit ST.

As described above, the second mitigation circuit RC2 has a smaller phase shift amount than the standard digital phase shift circuit ST. Thus, it is possible to decrease the phase shift amount using the second mitigation circuit RC2 instead of the standard digital phase shift circuit ST. Therefore, for example, when a distribution of phase shift amounts caused by weak reflections occurring in preceding and following positions of the connection unit 20 has a projection portion, the second mitigation circuit RC2 can be used to mitigate the projection portion.

As described above, in the fifth embodiment, a plurality of digital phase shift circuit groups 30 in which a plurality of digital phase shift circuits 10 are connected in cascade and one or more bend-type connection units 20 connected between two digital phase shift circuit groups 30 are provided, and at least one of the digital phase shift circuits 10 constituting at least one digital phase shift circuit group 30 is a mitigation circuit RC that mitigates a distribution of phase shift amounts. Thus, the distribution of phase shift amounts caused by weak reflections occurring in preceding and following positions of the connection unit 20 can be further mitigated.

Here, the mitigation circuit RC includes at least one of the first mitigation circuit RC1, which is a digital phase shift circuit 10 having a larger phase shift amount than the standard digital phase shift circuit ST, and the second mitigation circuit RC2, which is a digital phase shift circuit 10 having a smaller phase shift amount than the standard digital phase shift circuit ST. It is possible to mitigate a recess portion in the distribution of phase shift amounts using the first mitigation circuit RC1 and it is possible to mitigate a projection portion in the distribution of phase shift amounts using the second mitigation circuit RC2. Thus, using the first mitigation circuit RC1 and the second mitigation circuit RC2, it is possible to take a countermeasure even if the distribution of phase shift amounts has a recess portion or a projection portion.

Although embodiments of the present invention have been described above, the present invention is not limited to the above embodiments and modifications can be freely made within the scope of the present invention. Although a case where the frequency of the signal S is, for example, 30 [GHz], has been described in the above-described embodiments, the frequency of the signal S may be a frequency other than 30 [GHz]. For example, the frequency of the signal S may be any frequency in the frequency band of microwaves, quasi-millimeter waves, millimeter waves, or the like.

Although a configuration in which the digital phase shift circuit 10 includes the capacitor 5 (the second capacitor) has been described in the above-described embodiments, a configuration in which the capacitor 5 is absent may be used. In this case, the electronic switch 7*d* (the second electronic switch) connected to the lower electrode of the capacitor 5 may also be absent.

DESCRIPTION OF REFERENCE NUMERALS

1 Signal line
2 Inner line
2*a* First inner line
2*b* Second inner line
3 Outer line
3*a* First outer line
3*b* Second outer line
4 Ground conductor
4*a* First ground conductor
4*b* Second ground conductor
5 (Second) Capacitor
6 Connection conductor
6*a* to 6*g* Connection conductor
7 Electronic switch
7*a* to 7*d* Electronic switch
8 Switch controller
10 Digital phase shift circuit
10-1 to 10-40 Digital phase shift circuit
20 Connection unit
20-1 to 20-3 Connection unit
21 First connection line
22 Second connection line
22*a* Second connection line
22*b* Second connection line
23 Third connection line
23*a* Third connection line
23*b* Third connection line
24 First ground layer
25 Second ground layer
30 Digital phase shift circuit group
30-1 to 30-4 Digital phase shift circuit group
40 to 43 Via-hole
50 Capacitor
51 Electronic switch
100 Digital phase shifter
100A Digital phase shifter
100B Digital phase shifter
220 Side surface
R1 Return current
R2 Return current
Ra Distance
RC Mitigation circuit
RC1 First mitigation circuit
RC2 Second mitigation circuit
S Signal

The invention claimed is:

1. A digital phase shifter comprising:

at least one first digital phase shift circuit group in which a plurality of digital phase shift circuits are connected in cascade;

at least one second digital phase shift circuit group in which a plurality of digital phase shift circuits are connected in cascade; and at least one bend-type connection unit connecting a first digital phase shift circuit located at an end portion of the first digital phase shift circuit group and a second digital phase shift circuit located at an end portion of the second digital phase shift circuit group, wherein each digital phase shift circuit is a circuit including at least a signal line, two inner lines provided on both sides of the signal line, two outer lines provided outside of the two inner lines, a first ground conductor connected to one end of each of the two inner lines and the two outer lines, a second ground conductor connected to the other end of each of the two outer lines, and two electronic switches, one thereof being provided between the other end of one of the two inner lines and the second ground conductor, the other thereof being provided between the other end of the other of the two inner lines and the second ground conductor, the circuit being set in a low-delay mode in which a return current flows through the two inner lines or a high-delay mode in which a return current flows through the two outer lines, wherein a first capacitor is connected in parallel to at least one of a first connection line of the connection unit connecting the signal line of the first digital phase shift circuit and the signal line of the second digital phase shift circuit, a position in a vicinity of a connection position between signal lines of two adjacent digital phase shift circuits constituting the first digital phase shift circuit group, and a position in a vicinity of a connection position between signal lines of two adjacent digital phase shift circuits constituting the second digital phase shift circuit group, wherein at least one of the plurality of digital phase shift circuits includes:

a second capacitor connected between the signal line and at least one of the first ground conductor and the second ground conductor; and a second electronic switch configured to switch between whether or not to connect the second capacitor between the signal line and the at least one of the first ground conductor and the second ground conductor, and wherein the first capacitor constitutes no digital phase shift circuit.

2. The digital phase shifter according to claim 1, wherein the first capacitor is connected in parallel to an intermediate portion of at least one first connection line.

3. The digital phase shifter according to claim 1, wherein the first capacitor is connected in parallel to each of one end portion of at least one first connection line on the first digital phase shift circuit side and the other end portion of the one first connection line on the second digital phase shift circuit side.

4. The digital phase shifter according to claim 1, wherein the first capacitor is connected in parallel to each of a position in a vicinity of a connection position between the signal line of the first digital phase shift circuit and the signal line of a third digital phase shift circuit adjacent to the first digital phase shift circuit and a position in a vicinity of a connection position between the signal line of the second digital phase shift circuit and the signal line of a fourth digital phase shift circuit adjacent to the second digital phase shift circuit.

5. The digital phase shifter according to claim 1, comprising an electronic switch configured to switch between whether or not to ground one end side of the first capacitor.

6. The digital phase shifter according to claim 1, wherein at least one of the plurality of digital phase shift circuits is a mitigation circuit configured to mitigate a distribution of phase shift amounts.

7. The digital phase shifter according to claim 1, wherein the connection unit includes:

two second connection lines connecting the two inner lines of the first digital phase shift circuit and the two inner lines of the second digital phase shift circuit;

a ground layer arranged in at least one of positions above and below the first connection line and the two second connection lines; and a via-hole connecting at least the two second connection lines and the ground layer.

8. The digital phase shifter according to claim 7, wherein the connection unit includes two third connection lines connecting the two outer lines of the first digital phase shift circuit and the two outer lines of the second digital phase shift circuit.

* * * * *